US008417728B1

(12) United States Patent
Anders et al.

(10) Patent No.: US 8,417,728 B1
(45) Date of Patent: Apr. 9, 2013

(54) USER INTERFACES, METHODS, AND SYSTEMS FOR DEVELOPING COMPUTER APPLICATIONS USING ARTWORK

(75) Inventors: Mark Anders, San Francisco, CA (US); Adam Cath, San Francisco, CA (US); Narciso B. Jaramillo, Piedmont, CA (US); Allan Padgett, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 1226 days.

(21) Appl. No.: 12/242,052

(22) Filed: Sep. 30, 2008

Related U.S. Application Data

(63) Continuation-in-part of application No. 11/833,506, filed on Aug. 3, 2007.

(51) Int. Cl.
  *G06F 7/00* (2006.01)
  *G06F 17/30* (2006.01)
  *G06F 12/00* (2006.01)
  *G06F 15/16* (2006.01)
  *G06F 3/048* (2006.01)

(52) U.S. Cl. .................. 707/793; 707/899; 715/763

(58) Field of Classification Search .......... 715/762–763; 707/793, 899
See application file for complete search history.

(56) References Cited

U.S. PATENT DOCUMENTS

| | | | |
|---|---|---|---|
| 5,642,511 A | 6/1997 | Chow et al. | |
| 5,742,848 A | 4/1998 | Burgess | |
| 5,862,379 A | 1/1999 | Rubin et al. | |
| 6,178,432 B1 | 1/2001 | Cook et al. | |
| 6,564,368 B1 | 5/2003 | Beckett et al. | |
| 6,823,495 B1 | 11/2004 | Vedula et al. | |
| 6,854,089 B1* | 2/2005 | Santee et al. | 715/783 |
| 7,159,185 B1 | 1/2007 | Vedula et al. | |
| 7,240,328 B2 | 7/2007 | Beckett et al. | |
| 7,320,109 B1 | 1/2008 | Zeevi et al. | |
| 7,376,905 B2* | 5/2008 | Walker et al. | 715/764 |
| 7,441,200 B2* | 10/2008 | Savage | 715/762 |
| 7,644,368 B2* | 1/2010 | Pins | 715/762 |
| 7,823,075 B2* | 10/2010 | Suzuki et al. | 715/762 |
| 7,882,486 B2* | 2/2011 | Fernandez et al. | 717/105 |

(Continued)

OTHER PUBLICATIONS

Microsoft® Expression® 'Expression Blend Design Ultimate Experiences' 04 pages (2008) http://www.microsoft.com/expression/products/features.aspx?key=blend.

(Continued)

*Primary Examiner* — Jeffrey A Burke
(74) *Attorney, Agent, or Firm* — Kilpatrick Townsend & Stockton LLP

(57) ABSTRACT

Methods and systems for using artwork to develop computer applications in ways that preserve the artwork's appearance and layout, including by importing the artwork and selectively replacing potions with functional components. One embodiment comprises a method for developing an application that involves displaying artwork in a design view area. The method may involve displaying artwork comprising a list representation comprising a plurality of list item representations and identifying each list item representation as a group of one or more subitem representations. The method may further comprise determining a list layout for list items using the list item representations of the artwork and inserting a list as a component in the design view area. This list may determine or otherwise be used to determine the positions of either the list item representations or list items replacing the list item representations. These positions may be determined based on the list layout that was determined.

28 Claims, 35 Drawing Sheets

U.S. PATENT DOCUMENTS

| | | | | |
|---|---|---|---|---|
| 7,908,297 | B2* | 3/2011 | Waldman et al. | 707/803 |
| 2003/0202012 | A1* | 10/2003 | Kemp | 345/762 |
| 2003/0236775 | A1* | 12/2003 | Patterson | 707/3 |
| 2004/0001092 | A1* | 1/2004 | Rothwein et al. | 345/763 |
| 2006/0005120 | A1* | 1/2006 | Cooper et al. | 715/513 |
| 2006/0066631 | A1* | 3/2006 | Schorr et al. | 345/619 |
| 2006/0110045 | A1* | 5/2006 | Reissman | 382/203 |
| 2006/0203294 | A1* | 9/2006 | Makino | 358/400 |
| 2006/0294460 | A1* | 12/2006 | Chao et al. | 715/520 |
| 2007/0150821 | A1* | 6/2007 | Thunemann et al. | 715/762 |
| 2008/0094420 | A1* | 4/2008 | Geigel et al. | 345/660 |
| 2008/0109327 | A1* | 5/2008 | Mayle et al. | 705/27 |
| 2008/0136822 | A1* | 6/2008 | Schorr et al. | 345/441 |
| 2010/0031171 | A1* | 2/2010 | Zhang et al. | 715/762 |

OTHER PUBLICATIONS

Microsoft Expression Expression Blend 2 Beta Download, 07 pages (2008) file://C:\DOCUME~1\EJoswick\LOCALS~1\Temp\ZMF56O1D.htm.

Getting to Know the Work Area Adobe Illustrator CS Classroom in a Book, Lesson 1, pp. 30-47 (2008) http://www.adobe.com/education/pdf/cib/ps7_cib/ps7_cibO1.pdf.

Selection Basics, French Fries Adobe Illustrator CS Clasroom in a Book, Lesson 2, pp. 52-63 (2008) http//www.adobe.com/education/pdf/cib/ill_cs/ill_cs_cib_02.pdf.

What's New Adobe® Illustrator® CS3 Explore New Paths with the Essential Vector Tool pp. 1-9 (2008) http://wwwimages.adobe.com/www.adobe.com/products/illustrator/pdfs/illustrator_datasheet.pdf.

Adobe Illustrator: Illustrator Marquee Selection AllExperts Search Adobe Illustrator, 03 pages. (2008) http://en.allexperts.com/q/Adobe-Illustrator-1027/Illustrator-Marquee-Selection-1.htm.

Adobe Illustrator CS3 Dynamic Learning Excerpt Training Videos Books by AGI's Instructors AGI Aquent Graphics Institute, 05 pages (2008) http://www.agitraining.com/pages2/ill_3.html.

Creating Special Effects, Lesson 12 Adobe Photoshop CS, pp. 400-431 (2008) http://www.adobe.com/education/pdf/cib/ps7_cib/ps7_cib12.pdf.

Adobe Illustrator: Illustrator Marquee Selection AllExperts Search Adobe Illustrator, 03 pages (2008) http://en.allexperts.com/q/Adobe-Illustrator-1027/Illustrator-Marquee-Selection-1.htm.

* cited by examiner

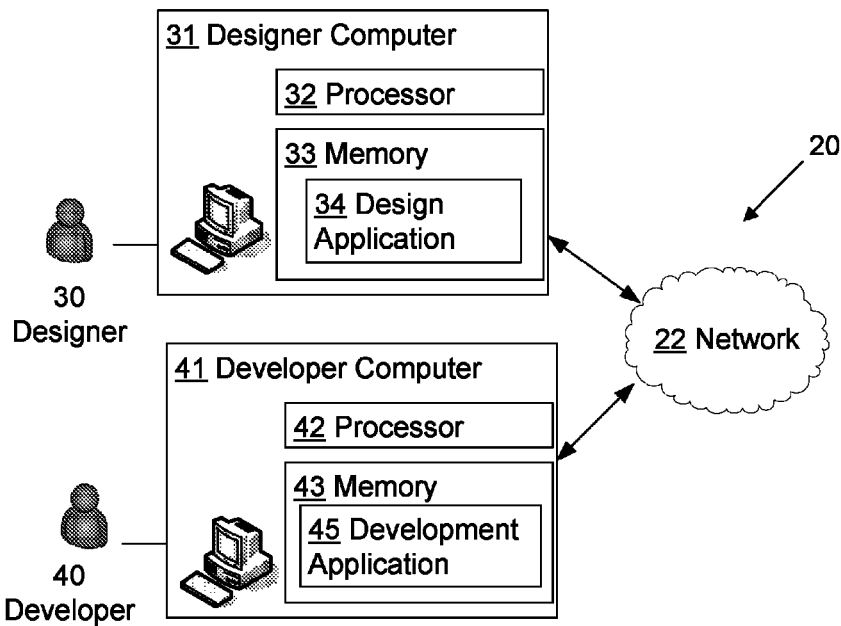
FIGURE 2a
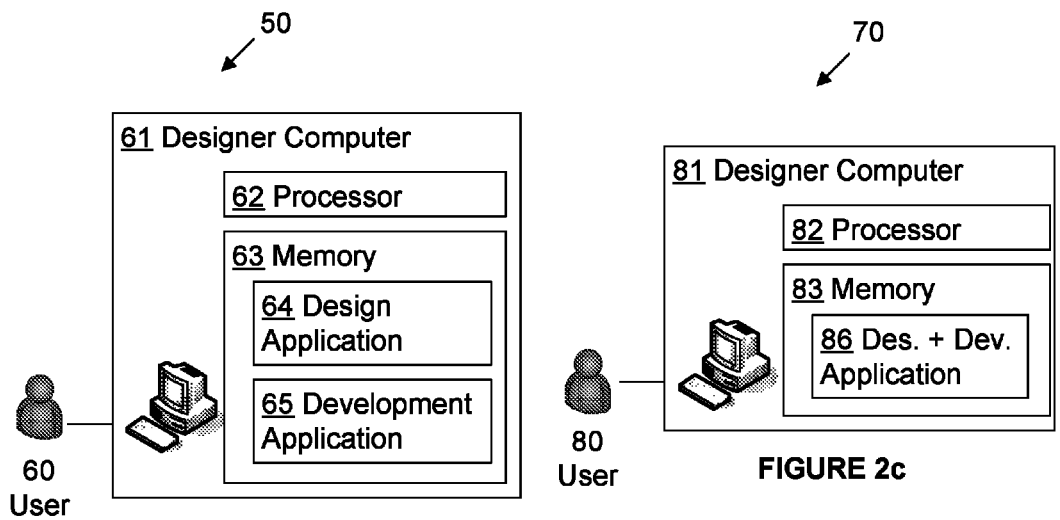
FIGURE 2b
FIGURE 2c

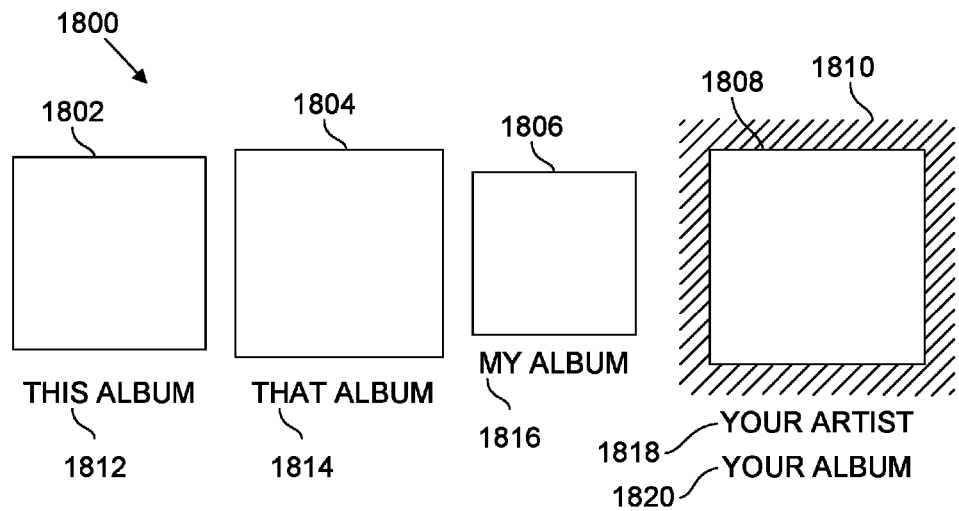

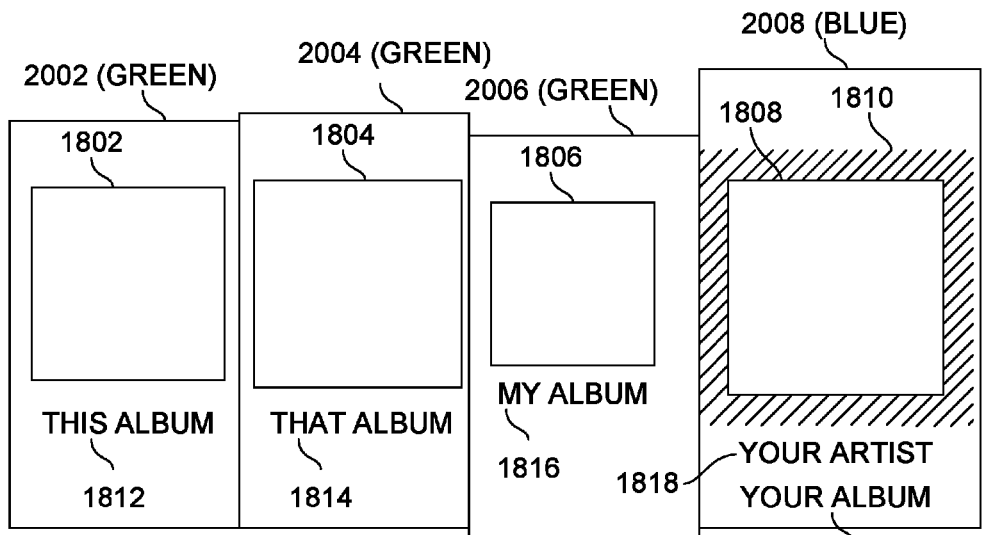

USER INTERFACES, METHODS, AND SYSTEMS FOR DEVELOPING COMPUTER APPLICATIONS USING ARTWORK

RELATED APPLICATION

This application is a continuation-in-part of U.S. Ser. No. 11/833,506 entitled "User Interfaces, Methods, and Systems for Developing Computer Applications Using Artwork" to Narciso B. Jaramillo et al., filed on Aug. 3, 2007, the entirety of which is hereby incorporated by this reference.

FIELD

The present disclosure relates generally to using artwork to develop computer applications in ways that preserve the artwork's appearance and/or layout.

BACKGROUND

The design and development process for many computer applications, including desktop applications, Web pages, and rich Internet applications, generally involves separate stages and often involves two or more sets of people with very different skill sets. Generally, there are designers who generate images of an application's appearance, for example, using a drawing program like Adobe® Photoshop®. Designers also often separately write specifications of how they want the application to behave, for example, when the user moves the mouse over a given part of the screen. Developers then take the images and specifications and develop a working application, generally by manually coding such an application. For example, in the context of web applications, a developer may first lay out a set of HTML tables or CSS stylesheets, then slice a designer's mockups into small pieces which are inserted into the tables or referenced by the CSS. The developer typically does this by "eyeballing" positions and then checking to see if the layout is the same. This is typically an error-prone process, in which the original appearance of the design can easily be incorrectly translated.

Similar problems are present in the design and development of rich Internet and desktop applications. Generally, the two-stage design-development process is subject to various disadvantages with respect to efficiency and accuracy of both the intended layout (where objects appear) and behavior (how objects act). Discrepancies often require additional iterations of the design-development process and, thus, additional effort by both designer and developer.

The use of declarative languages, platforms like the Adobe's® Flex® platform, and other technologies have helped reduce the gap in the design and development process. For example, declarative languages such as HTML and XML variants and related tools simplify assembling applications in many respects. However, inefficiencies and inaccurate artwork translation continue to hinder application development and there remains a substantial disconnect between artwork and application. While existing languages and tools provide flexibility in certain respects, they fail to adequately facilitate translation of a design image or other artwork to a collection of functional objects or other components that make a working application. In short, the path from a designer's broad graphical conception and functional intentions to a functioning application remains complicated and subject to inaccuracies and inefficiencies. The process of piecing apart and restructuring design artwork into a working application layout and a set of components remains both tedious and error-prone and is a commonly acknowledged pain point in the application design/development community.

SUMMARY

Embodiments provide methods and systems for using artwork to develop computer applications in ways that preserve the artwork's appearance and layout. Embodiments use artwork directly in an application and selectively replace potions of (or objects in) the artwork with functional components, such as buttons, lists, and menus. Such functional components may be given the appearance of the artwork portions (or objects) that they replace, thus maintaining the appearance of the original artwork. Embodiments also facilitate identifying and selecting artwork portions or objects for use in creating functional components. And, embodiments also provide tools and functions that facilitate the use or management of multiple artwork fragments, for example, the use of multiple portions of artwork to define different states of a given component. As used herein, the term "state" with respect to a component, refers to an appearance of a component under a specific condition, for example, the normal state of a button component is the button's appearance under normal conditions, the mouse-over state of a button component is the button's appearance when a user's mouse is placed over the button, etc.

One embodiment is a method of creating a list component from artwork. The exemplary method comprises displaying artwork comprising a list representation with a plurality of list item representations. The further comprises identifying each list item representation as a group of one or more subitem representations, determining a list layout for list items using the list item representations of the artwork, and inserting a list as a component. The list is a component that determines the positions of either the list item representations or list items replacing the list item representations. These positions may be determined based on the list layout. The method may further involve determining a list item template, wherein the list item template defines a structure for each of the list items.

In other embodiments, a computer-readable medium (such as, for example random access memory or a computer disk) comprises code for carrying out these methods.

These embodiments are mentioned not to limit or define the invention, but to provide examples of embodiments to aid understanding thereof. Embodiments are discussed in the Detailed Description, and further description is provided there. Advantages offered by the various embodiments may be further understood by examining this specification.

BRIEF DESCRIPTION OF THE FIGURES

These and other features, aspects, and advantages are better understood when the following Detailed Description is read with reference to the accompanying drawings, wherein:

FIGS. 2a-2c are system diagrams illustrating design and development environments according to several embodiments;

FIG. 17 illustrates a basic, exemplary high level workflow for creating a list component from artwork in one embodiments;

FIG. 18 illustrates the exemplary artwork representation of a list used to illustrate the workflow of FIG. 17;

FIGS. 20a-c illustrate defining multiple states according to one embodiment;

FIGS. 22a-c illustrate a workflow step relating to selection of a list's layout, according to one embodiment;

DETAILED DESCRIPTION

Embodiments provide methods and systems for converting artwork into an application, while preserving the layout of the original artwork. It is possible for application developers to take static artwork representing a detailed mockup of an application and directly convert it into working components in a real application, preserving the precise appearance and layout of the original artwork. Generally, "static artwork" is a collection of one or more graphic fragments, each fragment defined by a shape (for example a rectangle, circle, a complex curve), color and fill, effects and filters, size, location, and/or other visual properties. All or part of static artwork may be a bitmap image of one or more graphic fragments. An "application" includes one or more user interface components, each component defined by its type (Button, DataGrid, etc), its skins (the visual appearance of the different states of the components), text properties such as font and size (if the component involves text), sample data (if the component involves dynamic data), and so on. A "component" in the present context refers to any piece of an application or its user interface that has its own encapsulated appearance and/or behavior (e.g. button, checkbox, listbox). A component may or may not have different states and may or may not have one or more skins associated with such states. In this context, the term "skin" refers to the appearance of a component in a given state (for example, its normal state, its mouse-over state, its pressed state, etc.).

Introduction to Creating an Application Component Using Artwork

In one illustrative embodiment, static artwork created by a designer is used to create an application having functional components. The designer generates a piece of static artwork, for example a vector or bitmap file produced by a visual design tool such as Adobe® Photoshop® or Adobe® Illustrator®. The artwork is a mockup that represents an overall design for a user interface of an application. The designer sends the artwork to a developer for development of the intended application, perhaps with instructions regarding the intended behavior of the components. The developer converts the artwork from its static design mockup form into a working application.

Figure 1A:
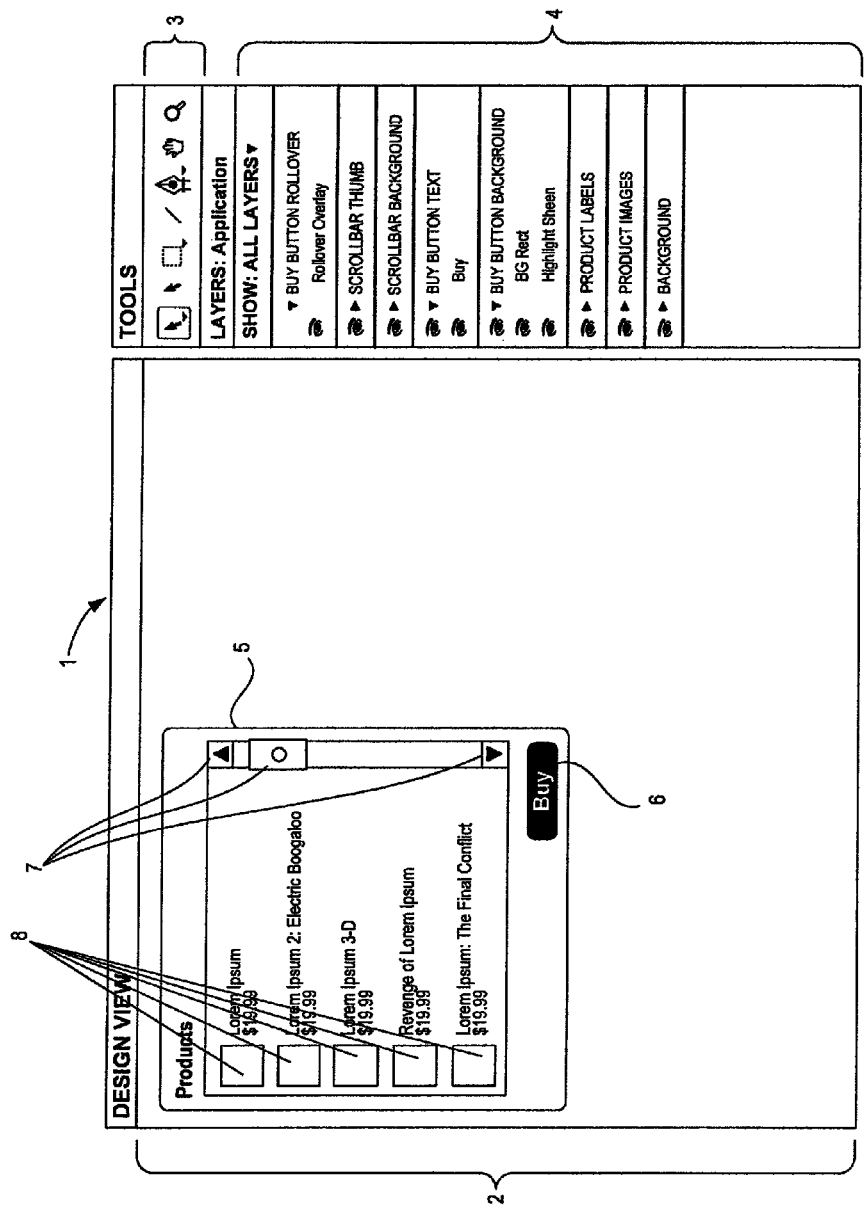
FIGS. 1a-1b illustrate an exemplary interface of an application development tool according to one embodiment.
Figure 1B:
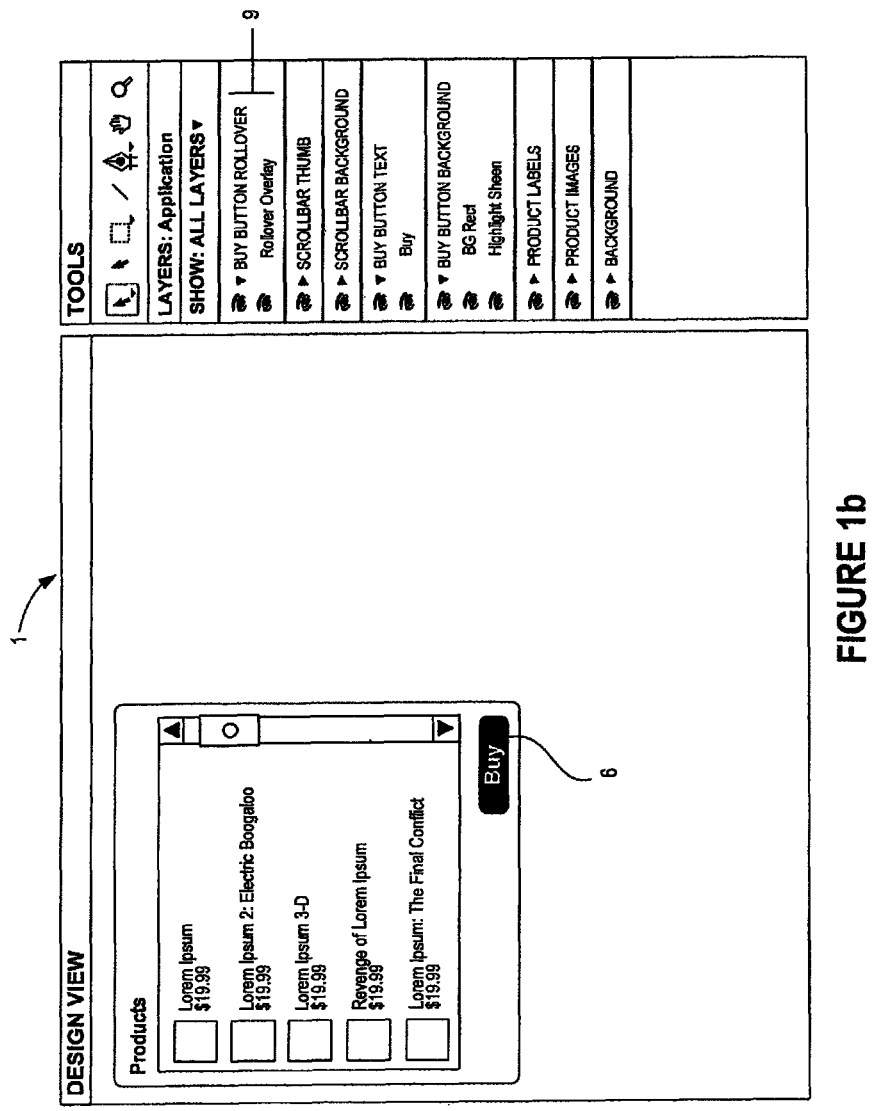

FIGS. 1a and 1b illustrate an exemplary interface of an application development tool. The overall workspace 1 of the application development tool includes a design view area 2, a tools panel 3, and a layers panel 4. In the present example, the user imports or draws a piece of artwork 5 into the design view area 2, which shows the artwork design 5 for a simple product browser application. In this case, all the items in the design view area 2 are raw vector graphics (rectangles with gradient fills, rounded rectangles, arrows, etc.). The artwork 5, among other things, shows the intended appearance of various intended components for the application, including a "Buy" button 6, a scroll bar 7, and various check boxes 8. The tools panel 3 contains various tools for drawing and selecting graphics. The layers panel 4 shows the graphic objects in the design, mapped or otherwise grouped based on the designer specified artwork layers. Such mapping may occur automatically when the artwork is imported into the developer tool. This structure reflects the designer's preferences and may not cleanly map to the final component structure needed in the intended working application. For example, the artwork that will eventually become a "Buy" button 6 may be scattered across different layers of the artwork 5 and thus may not have been grouped together when the artwork 5 was imported.

The developer uses the application development tool to identify portions of the artwork 5 that relate to the intended button component, for example, the image of the "Buy" button 6 displayed on the artwork 5. The developer then creates a new application component that will replace the static "Buy" button 6, but that will have an appearance similar to or the same as the static "Buy" button 6 image. For example, the vector artwork comprising the static "Buy" button may be saved as a separate file and referenced as a state of the new button component, e.g., the normal-state.

FIG. 1b illustrates features of the application development tool that allow the developer to further specify characteristics of the new "Buy" button component 6. In this case, the developer uses the interface of the development tool to specify that the "Buy" button will turn green when the application user mouses over it. The green overlay was specified by the artwork designer as a layer of the original artwork 5 that was imported into the development tool. The application developer turns on the visibility over that layer when the button is in its OVER state. In other words, the developer sets up the button component so that when it is rolled over, the overlay artwork layer is shown. For example, the developer may select the OVER state and use options on the layers panel 4 to specify that the BUY BUTTON ROLLOVER artwork layer is visible in that OVER state. Generally, by directly converting portions of the artwork into individual components and component states, the location and appearance of the original artwork is preserved, even though it has been pieced apart and restructured to fit the requirements of the application component.

This illustrative example is given to introduce the reader to the general subject matter discussed herein. The disclosure is not limited to this example. The following sections describe various additional embodiments and examples of methods and systems for using artwork to develop computer applications in ways that preserve the artwork's appearance and/or layout.

Illustrative Design and Development System Environments

FIGS. 2a-2c are system diagrams illustrating design and development environments according to several embodiments. Other embodiments may be utilized. The system 20 shown in FIG. 2a comprises a wired or wireless network 22 connecting a designer 30 using a designer computer 31 and a developer 40 using a developer computer 41. The devices 31, 41 each may comprise a computer-readable medium such as a random access memory (RAM) 33, 43, coupled to a processor 32, 42 that executes computer-executable program instructions stored in memory. Such processors 32, 42 may comprise a microprocessor, an ASIC, a state machine, or other processor, and can be any of a number of computer processors, such as processors from Intel Corporation of Santa Clara, Calif. and Motorola Corporation of Schaumburg, Ill. Such processors comprise, or may be in communication with, media, for example computer-readable media, which stores instructions that, when executed by the processor, cause the processor to perform the steps described herein.

Embodiments of computer-readable media comprise, but are not limited to, an electronic, optical, magnetic, or other storage or transmission device capable of providing a processor with computer-readable instructions. Other examples of suitable media comprise, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, JavaScript, and ActionScript.

In FIG. 2a, the designer computer 31 comprises a design application, for example an application that allows the designer 30 to generate a piece of static artwork such as a vector or bitmap file produced. Exemplary applications include Adobe® Photoshop® and Adobe® Illustrator®, but a variety of suitable applications may be appropriate according to the particular context or embodiment. The developer computer 41 comprises a development application 45, for example an application that allows a developer to import static artwork and convert some or all of the artwork to functional items to generate a functional application.

Methods may operate within a single device 50, 70 as shown in FIGS. 2b and 2c. In FIG. 2b, one or more users 60 use a designer computer 61, comprising a processor 62 and memory 63 having both a design application 64 and a development application 65. In FIG. 2c, one or more users 80 use a designer computer 81, comprising a processor 82 and memory 83 having both a design and development application 86 that allows the one or more users 80 to both design artwork and develop an application using the artwork.

Generally, the devices 31, 41, 61, 81 of FIGS. 2a-2c may also comprise a number of external or internal devices such as a mouse, a CD-ROM, DVD, a keyboard, a display, or other input or output devices. Examples of such devices are personal computers, digital assistants, personal digital assistants, cellular phones, mobile phones, smart phones, pagers, digital tablets, laptop computers, Internet appliances, and other processor-based devices. In general, a device may involve any type of processor-based platform that operates on any operating system, such as Microsoft® Windows® or Linux, capable of supporting one or more client application programs. Other applications can be contained in memory 33, 43, 63, 83 and can comprise, for example, a word processing application, a spreadsheet application, an e-mail application, a media player application, an instant messenger application, a presentation application, an Internet browser application, a rich Internet application player 32, a calendar/organizer application, and any suitable application or computer program. Other configurations may also involve server devices, mainframe computers, networked computers, and other system configurations appropriate for the particular context.

Certain embodiments relate to systems used to design artwork and develop applications. It will be recognized that this is merely one context for the methods and other features described herein. For example, certain embodiments will not involve a design application and certain embodiments will not involve the use of imported artwork. In short, the techniques for developing applications and the other features described herein have uses in a variety of contexts, not to be limited by the specific illustrations provided herein. The system shown in FIGS. 2a-2c are merely illustrative and are not intended to recite any system component or feature as essential or necessary to any embodiment.

Illustrative Embodiment of Using Artwork in Application Development

In one embodiment, a method is provided for a developer to convert artwork into an application. The developer begins by choosing a static artwork file and importing it into a development document within an application authoring tool. The imported artwork is presented to the developer in an interactive window in full fidelity. The developer then follows an interactive process for each component that s/he wants to appear in the resulting application. The developer chooses a certain kind of component to add to the application (e.g. button, checkbox, datagrid, or other pre-built component). Depending on which component is chosen, the application authoring tool will present the developer with a list of portions for the particular component type. For each portion, the developer may select one or more artwork fragments and assign those fragments to given portions. For example, a button component might have several states (for example up, down, over, and disabled) and parts (for example, a label) that may or may not appear different in the different states. The developer could choose several artwork fragments and assign one to each state. As each state is assigned, each artwork fragment is removed from the document and inserted into its own separate document that is associated with the particular component state.

The application authoring tool inserts into the document an instance of each component at the exact location and size of the original artwork representation of the component. The overall screen looks the same, but the portion that the developer has converted is now a working component rather than static artwork. By repeating the per-component process for each component that is desired in the resulting application, the developer accomplishes the desired goal of transforming static artwork into a working application.

Figure 14:
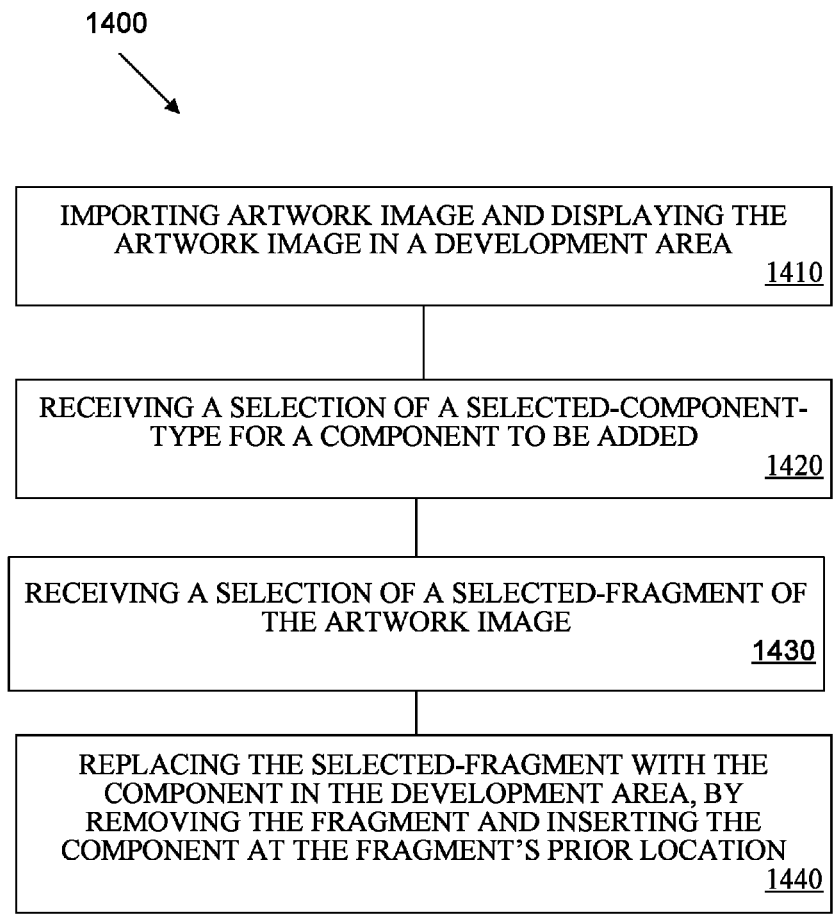
FIG. 14 is a flow chart illustrating one method of developing an application in an application development environment according to one embodiment.

FIG. 14 is a flow chart illustrating one method 1400 of developing an application in an application development environment according to one embodiment. The method comprises displaying artwork in a design view area, as shown in block 1410. The artwork may be multi-layered, contain groups and subgroups of objects, and/or may comprise visible and invisible objects. For example, the image may contain multiple layers of overlapping items. The design view area of the application development environment may be any area used to develop an application or part of an application, for example an area used to graphically develop the user interface of an application. The design view area of the application development environment may be a part of an interactive window that allows the developer to select and manipulate displayed items.

The method 1400 may comprise receiving a selection of a selected-component-type for a component to be added, as shown in block 1420. Example component types include buttons, checkboxes, and data grids.

The method 1400 may comprise receiving a selection of a selected-fragment of the artwork, as shown in block 1430. The selected-fragment from the artwork will be used to define the appearance of the component that replaces it. The selected-fragment may be an object defined by a designer of the artwork in the artwork. For example, the object could be a box representing the boundaries of a button intended by the designer. Receiving the selection of the selected-fragment may occur before, after, or during receiving the selection of the selected-component-type.

The method may further comprise replacing the selected-fragment with the component in the design view area, by removing the fragment and inserting the component at the fragment's prior location, as shown in block 1440. The selected-fragment appearance and other characteristics may be used to define the component, for example by associating a bitmap from the selected-fragment with a particular state or part of the component. For example, the selected-fragment from the artwork may be stored in a separate document that is associated with a particular state or part of the component. The component may also have a function or other behavior associated with it.

The method may further comprise receiving multiple selections of artwork fragments and receiving instructions to assign some or all of the fragments to particular states or parts of the component. The method may further comprise receiving a function-selection for the component, the function-selection specifying a behavior of the component during execution or use of the application. The method may further comprise receiving multiple selections of fragments of the artwork and receiving instructions to assign each fragment selected by the multiple selection of fragments to a particular state or part of the component.

Illustrative Embodiment of a Spelunking Tool

The application development tool may offer features to help the developer identify all the artwork fragments that are part of a given component. A selection or "spelunking" tool allows the developer to drag a selection marquee to approximately cover the screen area of the component that the developer is currently working on defining. The spelunking tool identifies all the individual artwork fragments that visually contribute to that screen area, and sets the authoring tool's 'current selection' to the set of fragments that it found. The spelunking tool may ignore the original structure of the artwork (which might be composed of layers, groups, groups within groups, and invisible or visible items) and focuses entirely on finding relevant graphic fragments, regardless of how they fit into the original document structure. Ignoring this structure is advantageous because the document structure as conceived by the original artist is often unrelated to the needs of the developer's task.

Figure 3:
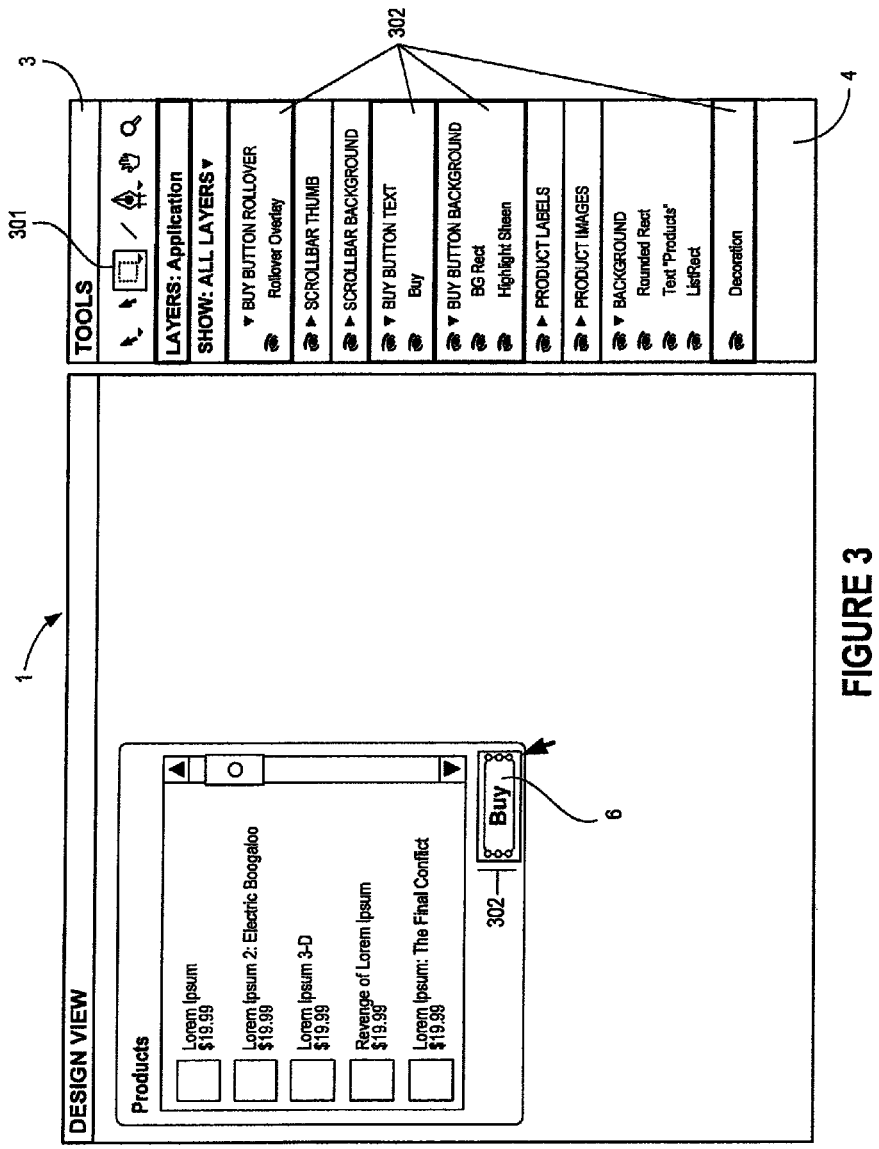
FIG. 3 illustrates an exemplary spelunking tool of the application development tool depicted in FIGS. 1a-1b according to one embodiment.

FIG. 3 illustrates an exemplary spelunking tool of the application development tool depicted in FIGS. 1a-1b according to one embodiment. As shown in FIG. 3, a developer may select a spelunking tool 301 from the tools panel 3 and drag a marquee rectangle 302 around an area of the screen where the artwork for the "Buy" button 6 is located. The spelunking tool selects all items that are completely contained in the rectangle, including hidden items (such as the rollover overlay, which is hidden in this diagram). This tool is thus specifically useful in cases where a designer has used hidden layers to show alternative states of intended components because it captures artwork fragments from all such layers. All selected fragments 303 are highlighted for the developer by the spelunking tool. Note that a "Decoration" item has been selected in the BACKGROUND layer. This item was not intended to be part of the button, but happens to be in the button area behind the button.

Figure 15:
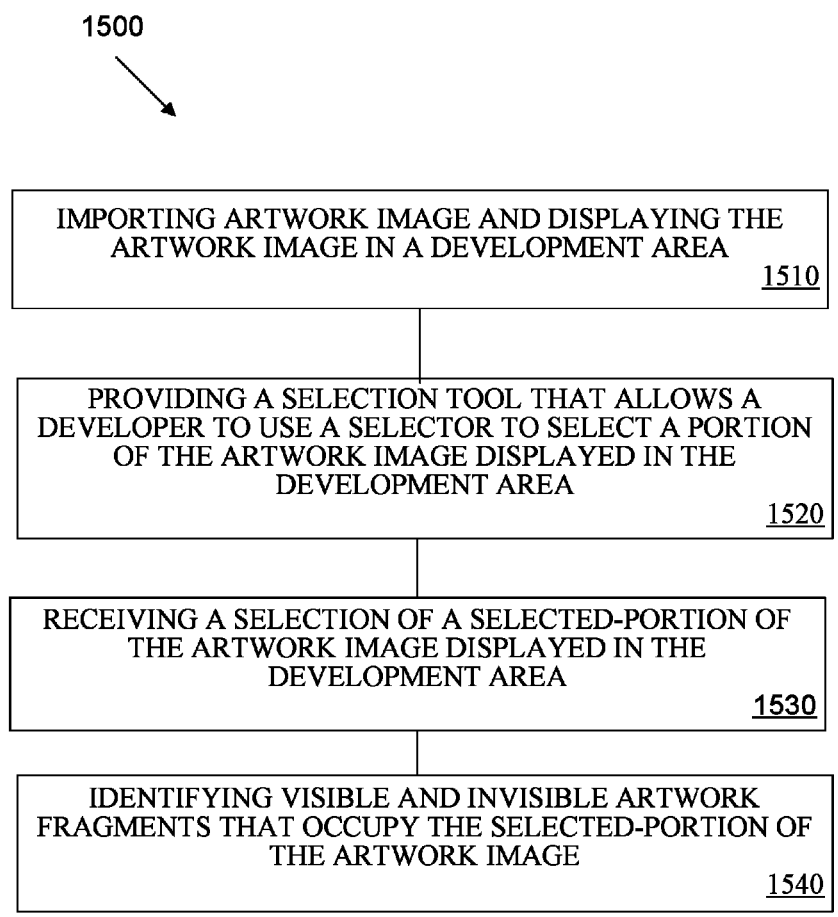
FIG. 15 is a flow chart illustrating one method of image fragment selection according to one embodiment.

FIG. 15 is a flow chart illustrating one method 1500 of image fragment selection according to one embodiment. The method comprises importing an artwork and displaying the artwork in a design view area of an application development environment, as shown in block 1510.

The method 1500 may further comprise providing a selection tool, the selection tool allowing a developer to use a selector to select a portion of the artwork displayed in the design view area, as shown in block 1520. The artwork fragments that are identified as occupying the selected-portion may be those that are entirely within the selected-portion or may be those that are entirely or partially within the selected-portion. The selector may be a selection marquee that is used to approximately cover the screen area of the component that the developer is currently working on defining.

The method 1500 may further comprise receiving a selection of a selected-portion of the artwork displayed in the design view area, as shown in block 1530. For example, a developer may have used the selection tool to make a selection of a portion of an artwork containing various layers of a button object, the button object providing artwork fragments for various intended appearances of the application's button component.

The method 1500 may further comprise identifying visible and invisible artwork fragments that occupy the selected-portion of the artwork displayed in the design view area, as shown in block 1540. For example, the spelunking tool may recognize fragments of the artwork from different layers, whether visible or invisible, that are entirely or partially within the selected-portion of the artwork.

In an alternative embodiment, the application authoring program automatically determines which artwork fragment should be assigned to each component part. For example, if a developer is creating a button, and the developer has selected artwork that includes a text item, the system can convert the background artwork into the normal state for the button, and then extract the style of the text (font, size, etc.) and apply it to the button's built-in text component. The tool may also adjust the text padding of the button to match the location of the text in the mockup. Variations on this basic method are possible, dealing with converting other states of the button (besides the normal state) into a component state or part, or converting selected artwork into the presentation of a data-bound item in a list.

Generally, the application development tool can try to automatically pick apart the artwork and attach fragments to different states or parts using heuristics and/or can provide the developer with a user interface for mapping the selected artwork fragments (or both). Heuristics for automatic mapping include taking multiple selected layers and assuming that they refer to separate states or parts, and looking at the layout of sub-groups of the selected artwork to guess their function (e.g. the thumb, track, and up/down arrows in a scrollbar).

Illustrative Embodiment of a Scratch Pad Tool

A second feature useful in application development according to an embodiment is a "scratchpad" that offers a way for the developer to manipulate a set of artwork fragments. For example, once a developer has used a spelunking tool to identify a set of artwork fragments that pertain to a certain component, the developer can tell the scratchpad to remember that list of fragments. A window or panel may be provided by the application development tool in which the developer can view the list of items that is currently in the scratchpad, and may allow the developer to add and remove items from the list. A scratchpad therefore may allow a developer to easily see selected and accurately manipulate that list of selected items. Such a scratchpad allows the developer to easily and accurately work with a specific set of artwork fragments, for example in preparation for assigning a set of artwork fragments to a component part, as described above.

Figure 4:
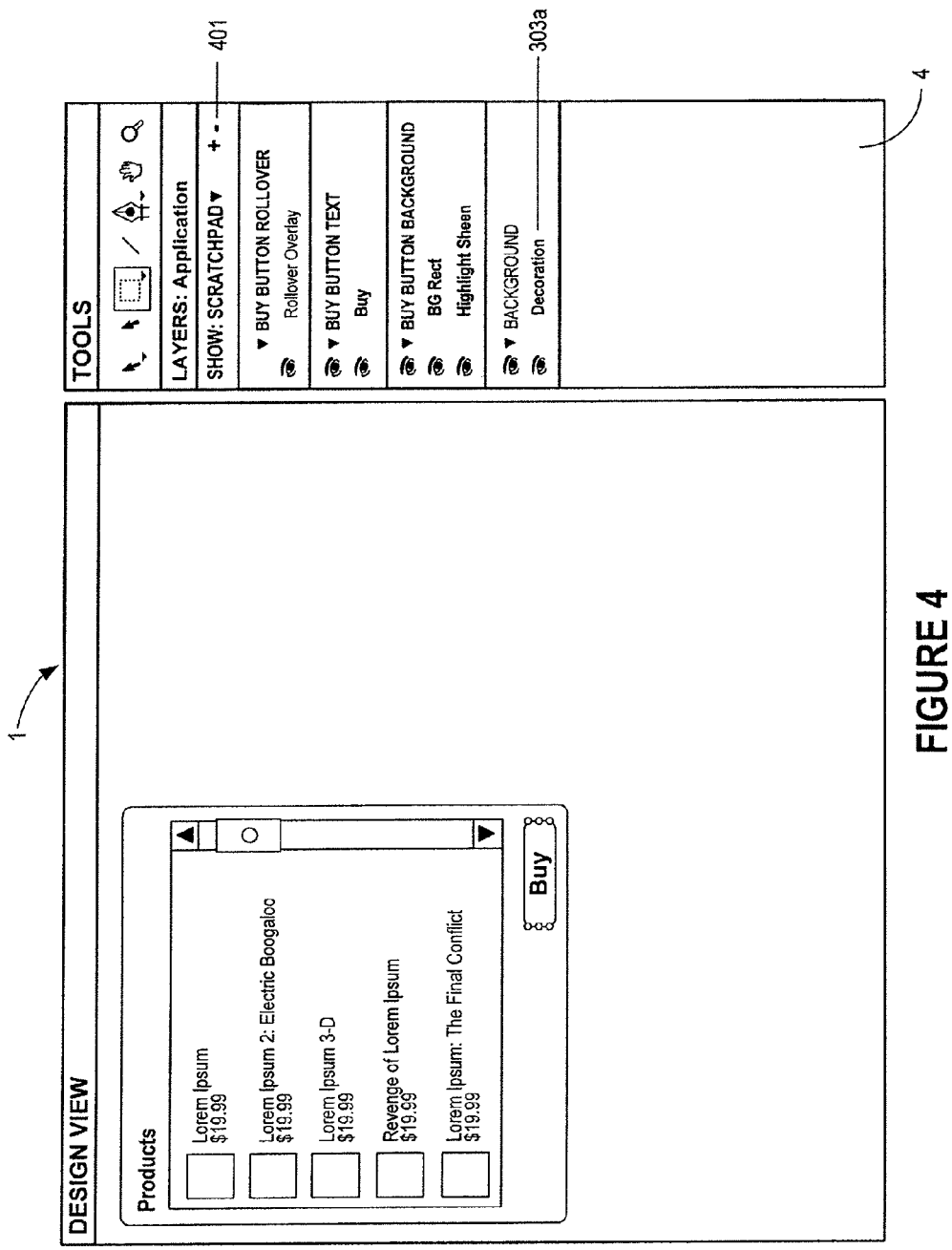
FIG. 4 illustrates an exemplary scratchpad tool of the application development tool depicted in FIGS. 1a-1b according to one embodiment.

FIG. 4 illustrates an exemplary scratchpad tool of the application development tool depicted in FIGS. 1*a*-1*b* according to one embodiment. In order to fine-tune a selection of artwork fragments, for example to ensure that only appropriate artwork fragments are selected, a developer may utilize a scratchpad tool. For example, after selecting items with a spelunking tool, a developer may choose to convert the currently selected items into a scratchpad 401. This process may filter the layers lists displayed in the layers panel 4 so that only items that were part of the selection are displayed in a scratchpad 401. The developer can now select the extraneous "Decoration" reference 303*a* and remove it from the scratchpad, for example using a remove from scratchpad command.

Figure 16:
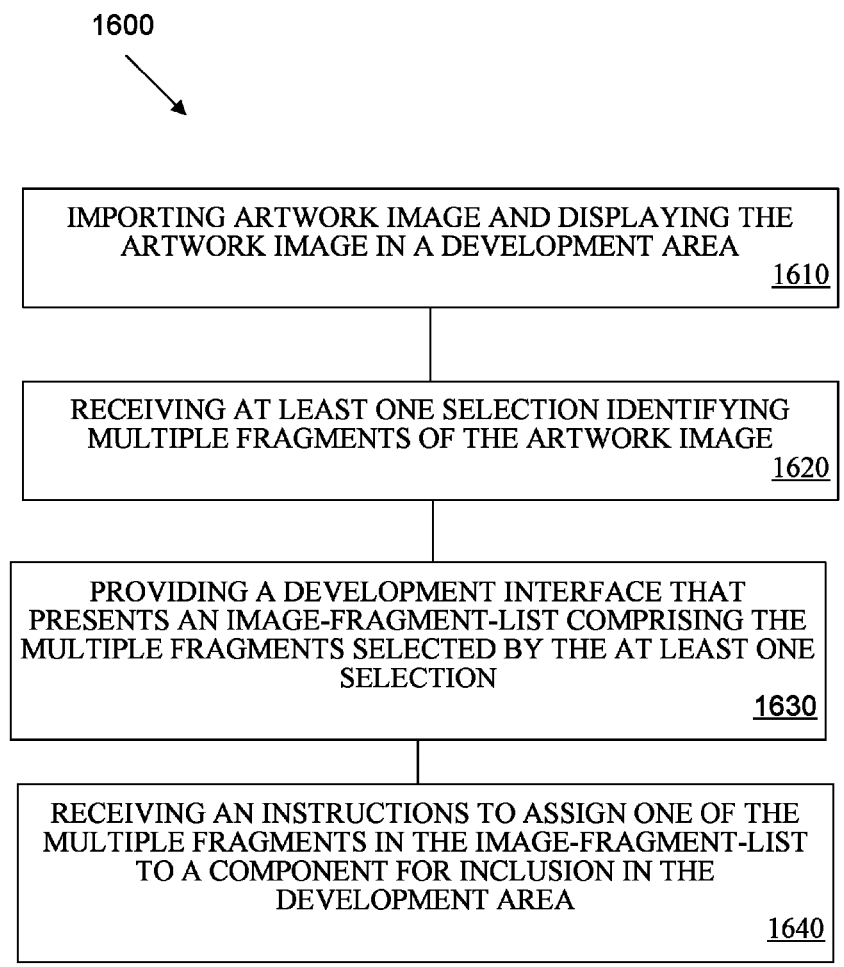
FIG. 16 is a flow chart illustrating one method of associating multiple image fragments with an application component according to one embodiment.

FIG. 16 is a flow chart illustrating one method 1600 of associating multiple image fragments with an application component according to one embodiment. The method comprises importing an artwork and displaying the artwork in a design view area of an application development environment, as shown in block 1610.

The method 1600 may further comprise receiving at least one selection identifying multiple fragments of the artwork, as shown in block 1620. For example, such fragments may be selected using a spelunking tool as described above, selected one at a time by a developer, or otherwise selected as appropriate for the circumstances.

The method 1600 may further comprise providing a development interface that presents an image-fragment-list comprising the multiple fragments selected by the at least one selection, as shown in block 1630. Such an image fragment list or scratchpad tool may be a window or panel provided by the application development tool in which the developer can view the items of the list and may allow the developer to add and remove items from the list.

The method 1600 may further comprise receiving instructions to assign one of the multiple fragments in the image-fragment-list to a component for inclusion in the design view area, as shown in block 1640. For example, such an instruction could specify that a fragment in the image-fragment-list is to be associated with a particular state of a button component such that the particular state of the button component will have the appearance of the fragment.

Figure 5:
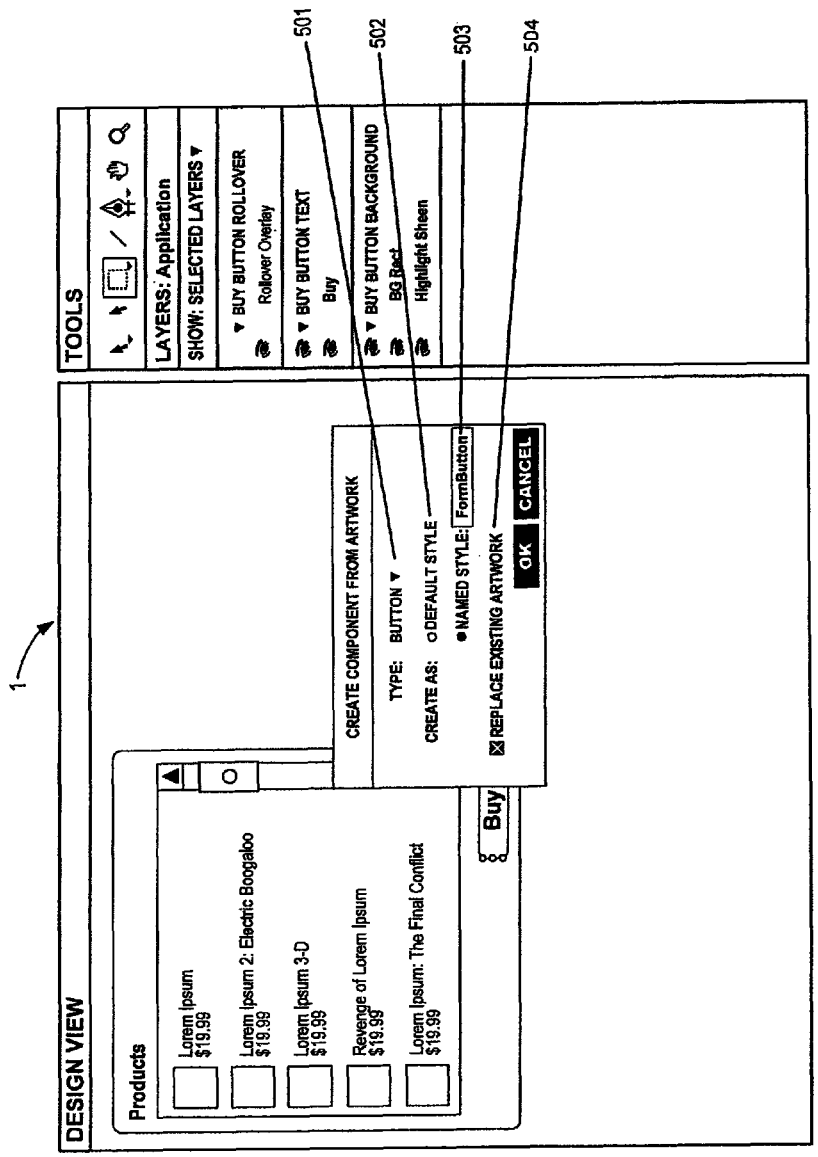
FIG. 5 illustrates an exemplary interface for creating a multi-state application component from artwork fragments using the application development tool depicted in FIGS. 1a-1b according to one embodiment.

Illustrative Embodiment of Creating a Multi-State Component From Artwork Fragments FIG. 5 illustrates an exemplary interface for creating a multi-state application component from artwork fragments using the application development tool depicted in FIGS. 1*a*-1*b* according to one embodiment. Once a developer has selected the artwork fragments that will make up the component states or parts, this disclosure provides simple and convenient techniques for converting/replacing the fragments with a working component. For example, a developer may select a CREATE COMPONENT FROM ARTWORK TOOL using a menu or dialog of the application development tool interface. For example, the developer may use a dialog 502 to specify or choose what type of component to create. The interface may provide the developer with a list of built-in components, as well as an option to create or customize a component (not shown). The developer may also choose whether to make this the default appearance of the given component or to create a named style (usable by other similar components) for the new appearance. In FIG. 5, the tool shows that the developer is creating a style named "FormButton," as shown by the named style selection 503. Finally, the developer can choose 504 whether or not to remove the original artwork when creating the new component.

Figure 6:
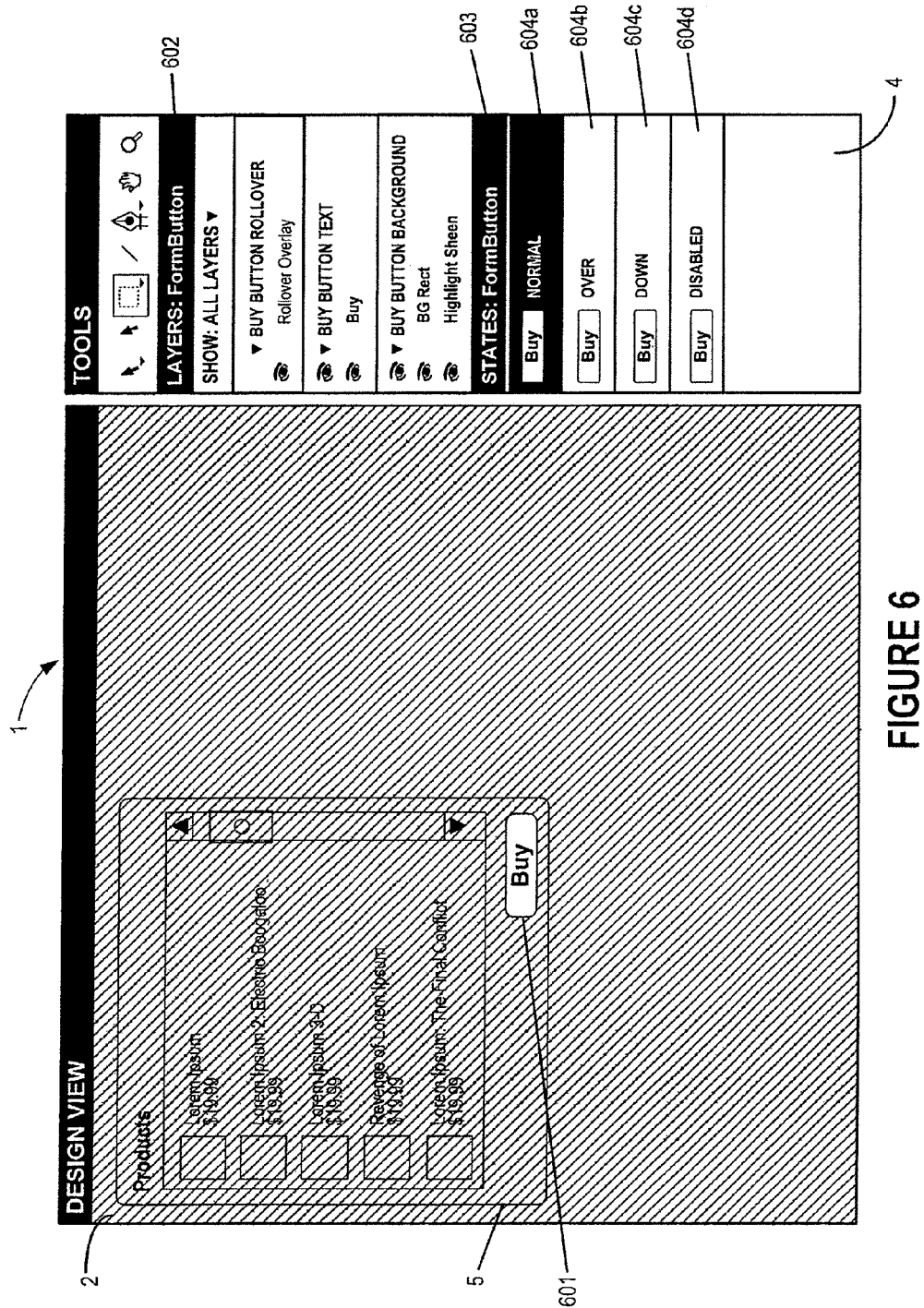
FIG. 6 illustrates the exemplary interface for creating a multi-state application component from artwork fragments using the application development tool depicted in FIG. 5 according to one embodiment.
Figure 7:
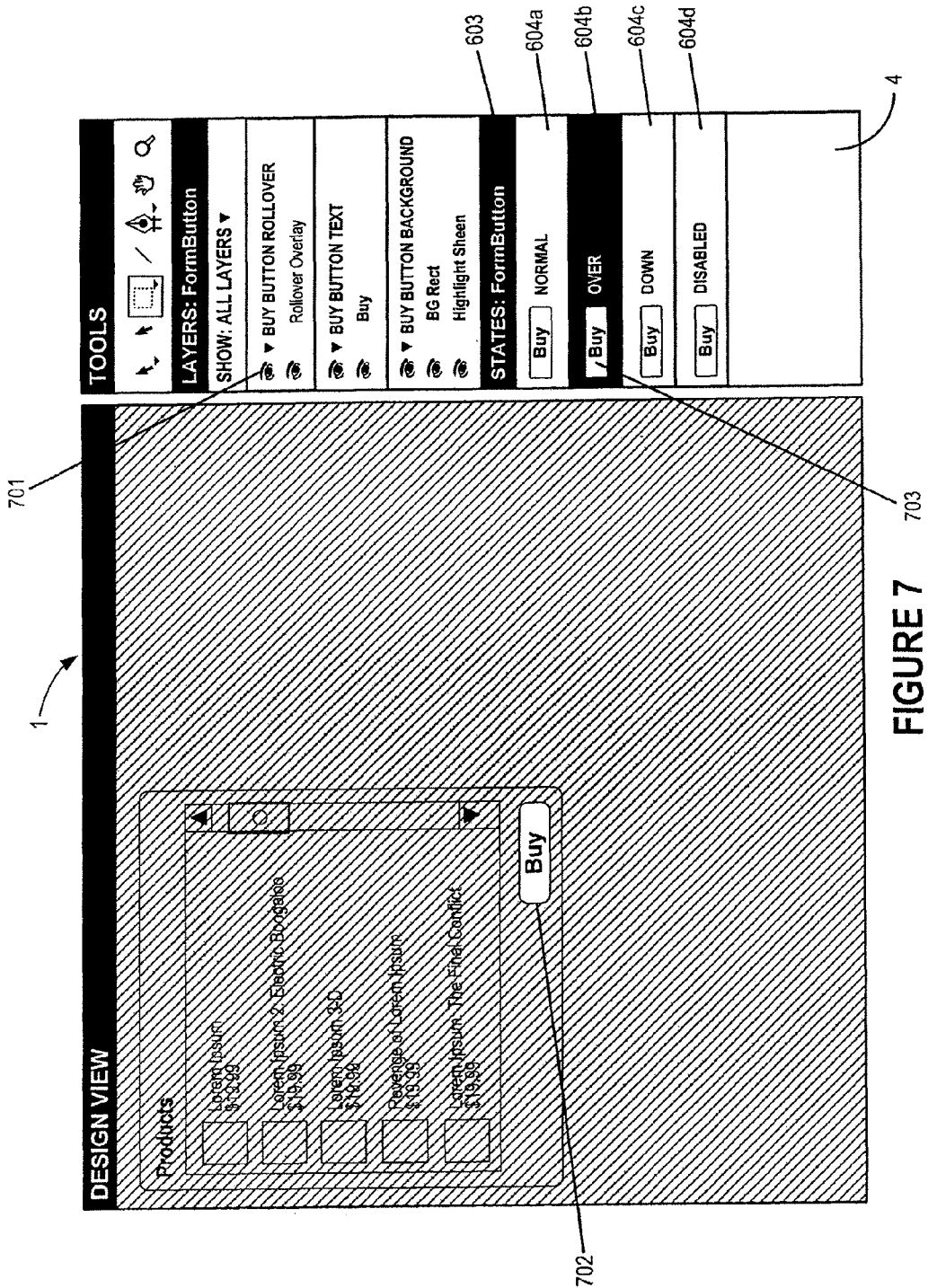
FIG. 7 illustrates the exemplary interface for creating a multi-state application component from artwork fragments using the application development tool depicted in FIG. 5 according to one embodiment.

FIGS. 6-7 further illustrate the exemplary interface for creating a multi-state application component from artwork fragments using the application development tool depicted in FIG. 5 according to one embodiment. After the developer initiates creation of a component as illustrated in FIG. 5, several things may happen. A real component, in this case a button 601, is created at the exact location and size of the original artwork. The original artwork for the button 6 is extracted into the states or parts of the newly created button component 601. The developer is then able to edit the newly created button characteristics. Other portions of the design may be grayed out (or otherwise unavailable for modification) while the developer edits the button component characteristics. In addition, a title 602 on the layers panel 4 may change, e.g., to "LAYERS: FormButton," to reflect that only the layers for the button are being edited.

Also shown in FIG. 6 is a "States" panel 603 that shows the different states of the button component. As shown, all of the states 604 are the same because the developer has yet to customize them—each is given a default appearance derived from the selected fragment of the visible layer of the artwork. In certain other embodiments, the states of the component will automatically populate with fragments from different layers of the artwork. Such automatic population may be based on any suitable heuristic and may, for example, correlate an artwork layer name or other identification with a component state name or other identification.

While FIG. 6 shows the "NORMAL" state 604a as selected for editing in the design view area 2, FIG. 7 illustrates the "OVER" state 604b as selected for editing in the design view area 2. Here, the developer wants to set up the button so that when it is rolled over, the overlay artwork layer is shown. Thus, the developer has selected the OVER state 604b in the States panel 603. The developer may then use the Layers panel 602 to toggle and make the BUY BUTTON ROLLOVER artwork layer visible in the design view area 2. Here, the developer clicks on an eyeball icon 701 to specify that whenever the button is in the OVER state, the layer and its contents are toggled on. This customized appearance is now visible in the design view button image 702 and in the OVER thumbnail image 703 in the States panel 603.

Other chances may be made to customize the appearance of a component in one or more given states. For example, rather than showing a particular layer in order to make the button appear disabled, the developer could choose the disabled state 604d and simply set the color, for example by changing a "BG Rect" characteristic to "light gray."

Figure 8:
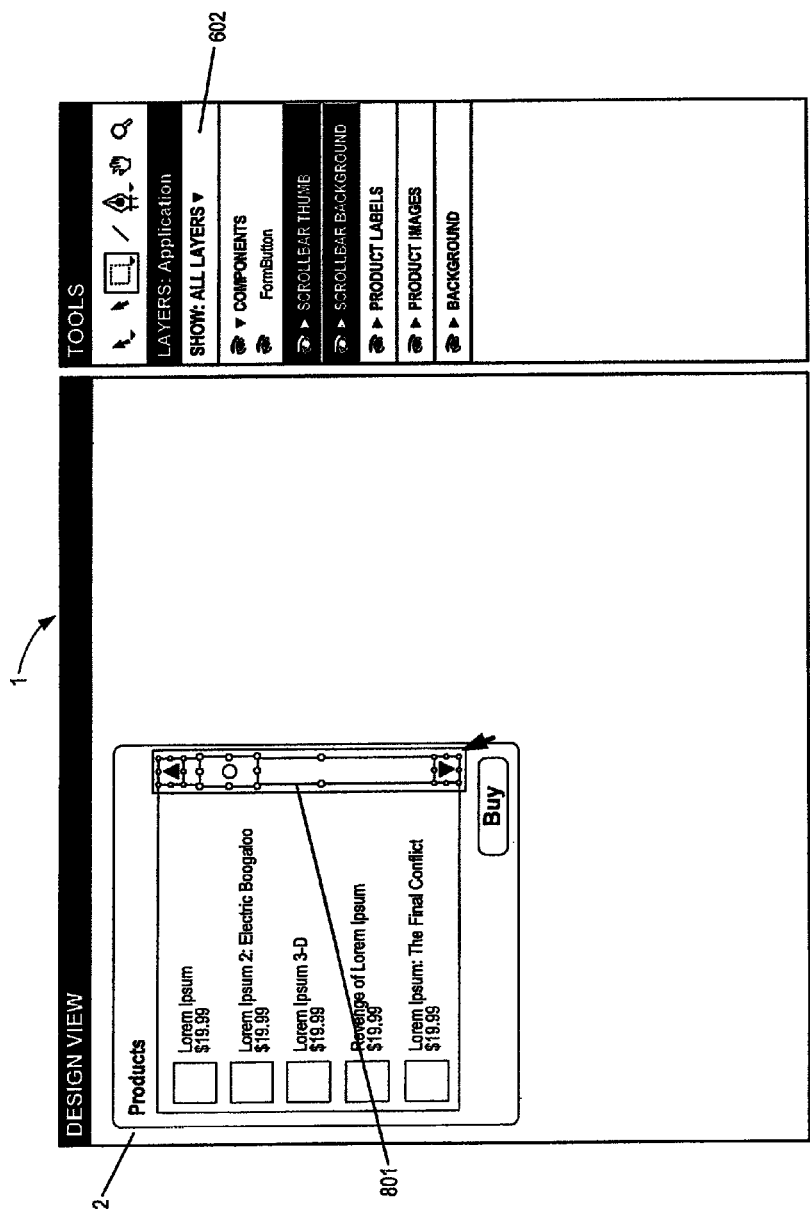
FIG. 8 illustrates an exemplary interface for creating a multi-part application component from artwork fragments using the application development tool depicted in FIGS. 1a-1b according to one embodiment.
Figure 9:
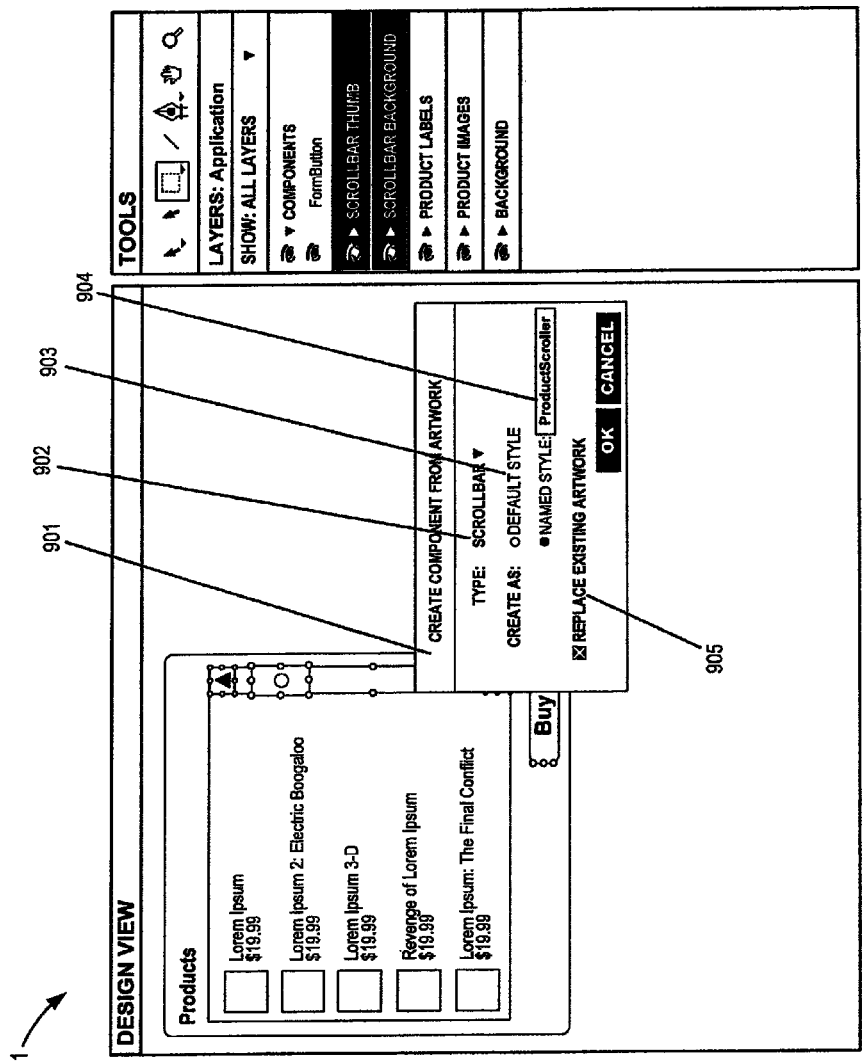
FIG. 9 illustrates creating a multi-part application component from artwork fragments according to one embodiment.
Figure 10:
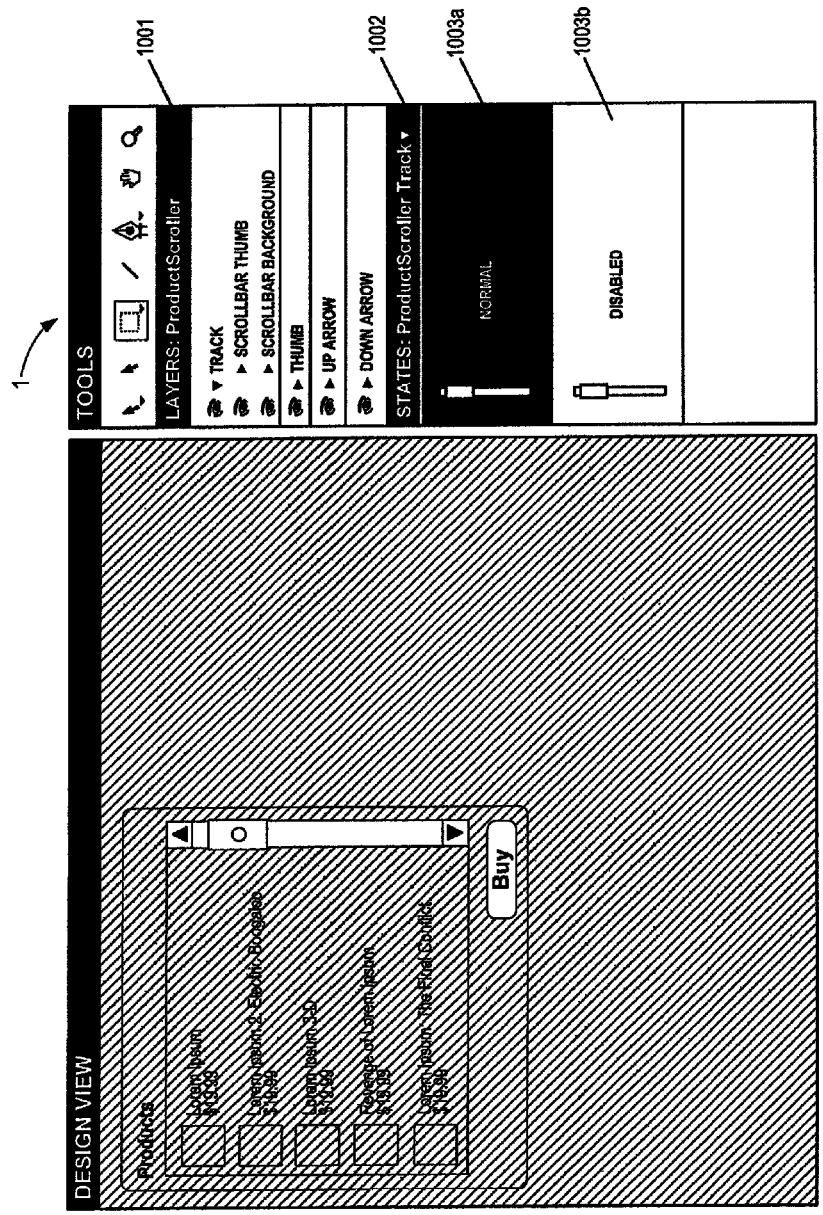
FIG. 10 illustrates creating a multi-part application component from artwork fragments according to one embodiment.

Illustrative Embodiment of Creating a Multi-Part Component From Artwork Fragments FIGS. 8-10 illustrate an exemplary interface for creating a multi-part application component from artwork fragments using the application development tool depicted in FIGS. 1a-1b according to one embodiment. Specifically, artwork fragments are converted to make a scrollbar component. Scrollbars are more complex than buttons because they have multiple parts, for example a thumb that the user can drag in order to scroll up or down, a track that the thumb slides on and an up arrow and down arrow that the user can click in order to scroll incrementally. Each of these parts may have its own states. For example, the thumb, up arrow, and down arrow each may act like a button, with four states (normal, over, down, and disabled), while the track may have only two states, normal and disabled.

FIG. 8 illustrates a spelunking tool used to select the scrollbar artwork 801. This artwork is split into two layers in the layers panel 602. The exact structure of the individual artwork items is not shown here, but can be assumed to contain hidden layers with the rollover states of the up arrow, down arrow, etc.

FIG. 9 illustrates initiation of creating a multi-part (scrollbar) application component from artwork fragments. Once artwork fragments are selected, the developer selects a CREATE COMPONENT FROM ARTWORK tool 901 specifying a scrollbar component type 902 to create as a style named "ProductScroller," as shown by the named style selection 903. The developer has also chosen to replace the existing artwork option 905.

FIG. 10 illustrates the user interface after the developer has invoked the CREATE COMPONENT FROM ARTWORK tool and created the component. The layers panel 1001 specifies the four parts of the newly created scrollbar component—the track, thumb, up arrow, and down arrow. Preferably, these layer parts may not be deleted by the developer. Because the scrollbar has multiple parts, the developer may select which artwork goes with which part. By default, all of the initial artwork is placed into the track part and the other parts are left empty. The developer is then able to associate artwork with appropriate parts, for example by using normal drawing gestures such as cutting and pasting, dragging and dropping, and otherwise using the interface to make the associations. The states panel 1002 shows the states of a particular part—one part at a time. In FIG. 10, states panel 1002 shows the normal and disabled states 1003 for the track part of the scrollbar component. The interface may allow the developer to switch which part the states panel 1002 is inspecting.

Figure 11:
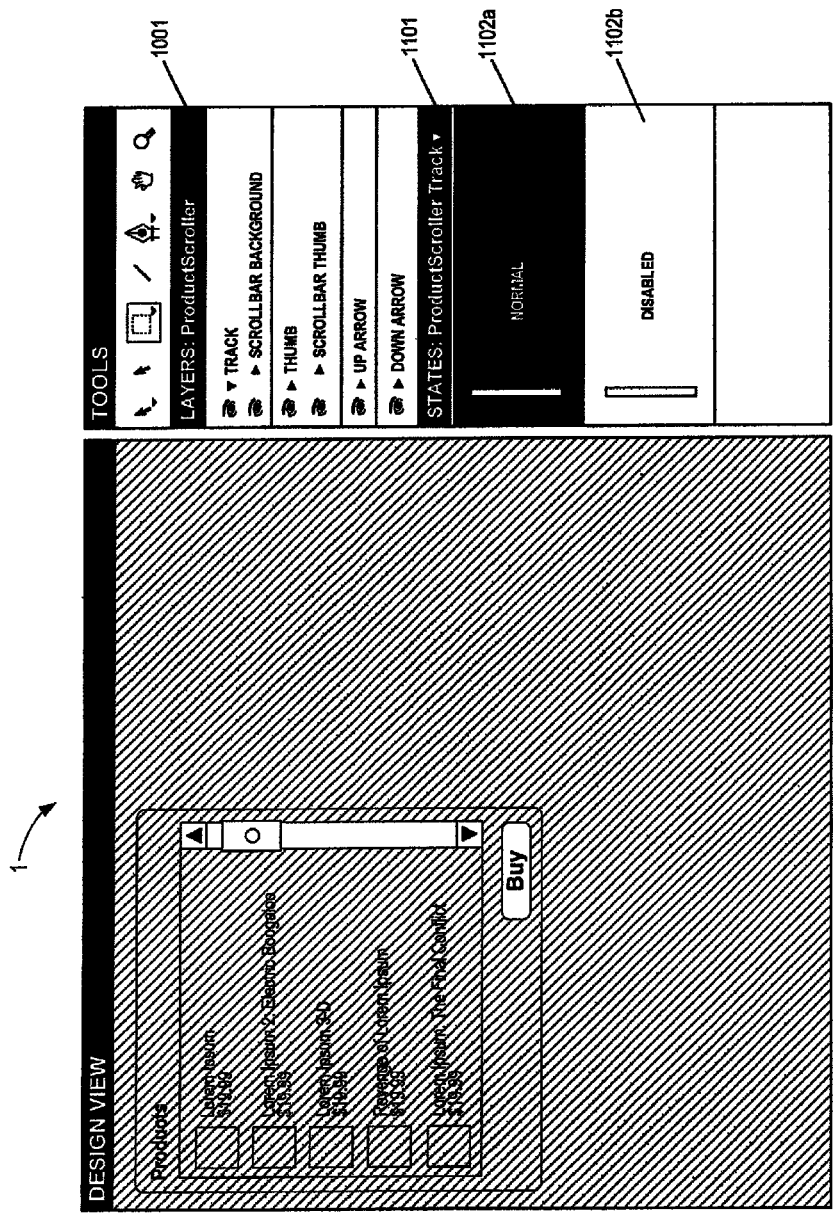
FIG. 11 illustrates the appearance of an application development tool interface after a developer has associated artwork fragments into appropriate parts of a multi-part component according to one embodiment.
Figure 12:
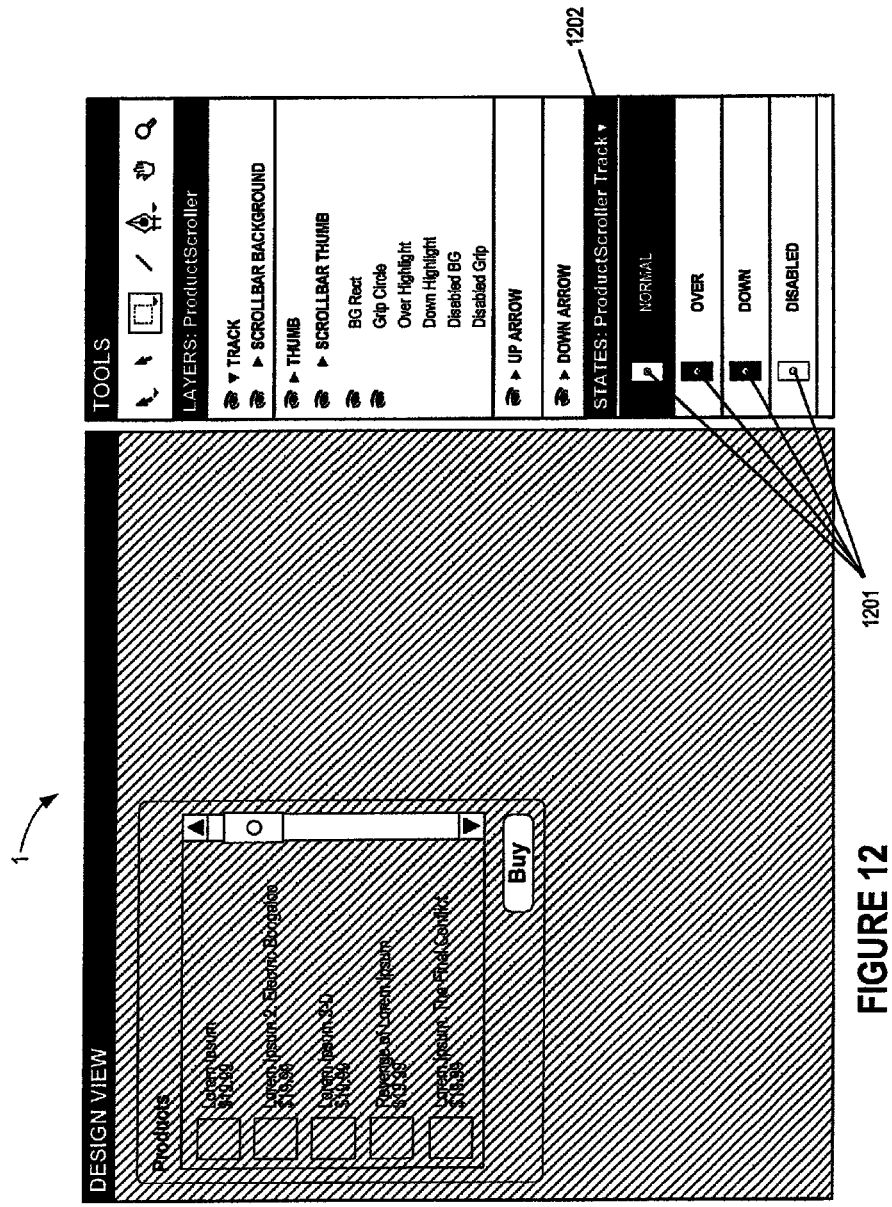
FIG. 12 illustrates the appearance of an application development tool interface after a developer has associated artwork fragments into appropriate parts of a multi-part component according to one embodiment.
Figure 13:
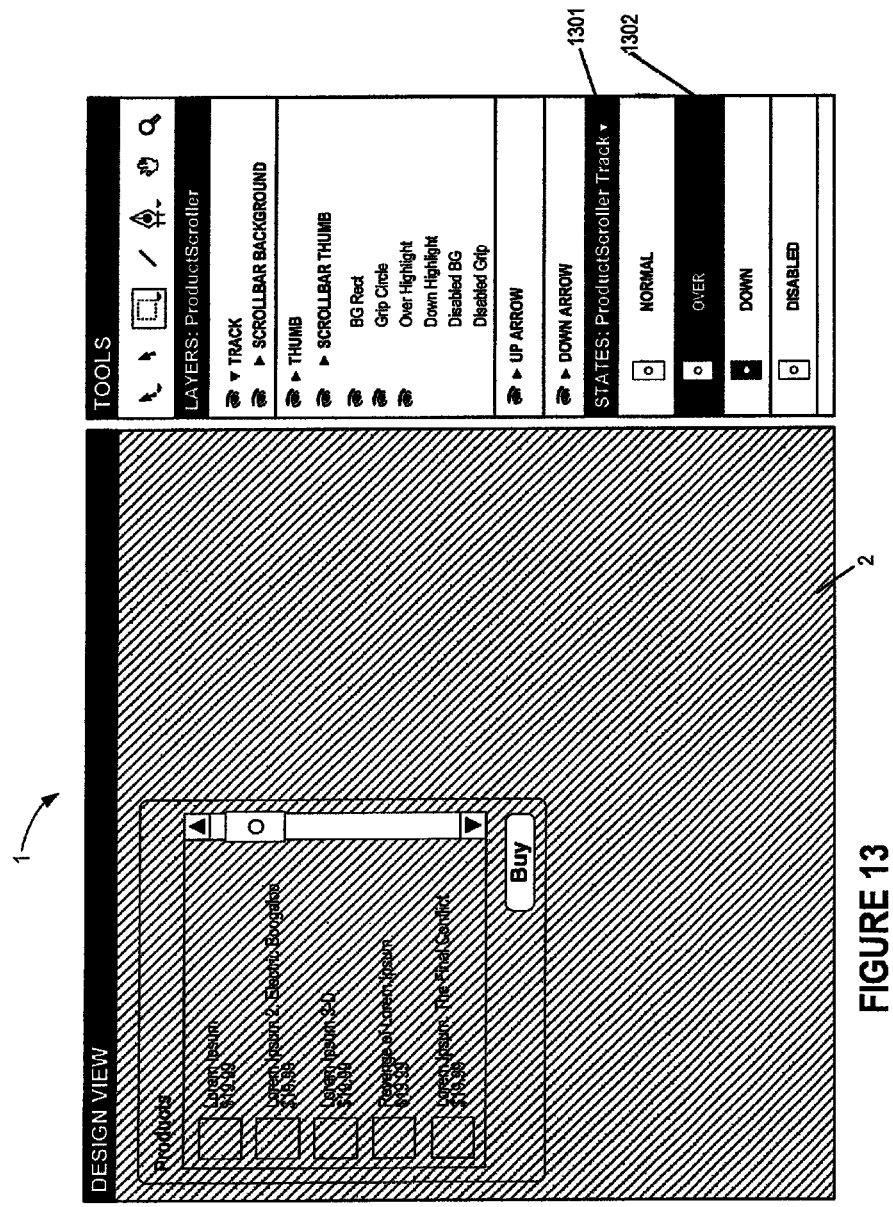
FIG. 13 illustrates the appearance of an application development tool interface after a developer has associated artwork fragments into appropriate parts of a multi-part component according to one embodiment.

FIGS. 11-13 illustrate how an application development tool interface may look after a developer has associated artwork fragments into appropriate parts of a multi-part component. For example, the states 1101 of the track show only the track artwork fragments 1102 and the thumb artwork 1201 has been moved into the thumb part 1202. Note that when the OVER state 1302 of the thumb part of the scrollbar component is selected in the states layer 1301, the design view area 2 changes to display the OVER state appearance 1303.

Illustrative Embodiment of Creating a List Component From Artwork

Certain embodiments provide methods for using artwork to create components that use dynamic data such as list components. A list component may be created from a mock up or other art work displaying the intended appearance of the list component. A list component, in this context, is any component using or displaying dynamic data that is received at run time. During development, a developer may not necessary know where data for the list component is going to be located or exactly what the data will include. In many cases, a list component will use or display multiple items, the number of which is not known during design and development.

Certain embodiments provide various features that facilitate the conversion of an artwork representation of a list component into an actual list component. For example, the format and characteristics of the list can be manually or automatically created based on the artwork. The layout of the items within a list component (e.g., horizontal, vertical, grid, diagonal, etc.) may be inferred or derived from a mock up or other artwork's representation of list items. Alternatively, in certain embodiments a developer is able to specify or alter the layout of the list component. A user interface may be provided to facilitate creating or defining the format of a list component. The user interface may automatically identify or allow a user to identify a subset of parts within a piece of art work as the different items in the list.

A variety of techniques can be used to determine a list component layout. In certain embodiments, a layout can be approximated by a function. For example, a horizontal layout may be approximated by a horizontal line, a vertical layout can be approximated by a vertical line, a circular layout can be approximated by a circle, etc. One exemplary use of a function, approximates each item as a point location and does a regression to match a function that can be used to approximate the layout. Different types of functions/layouts can be tested against a threshold level of accuracy. Such testing can begin with relatively simply models and progress to more complicated models until a suitable function is determined. Multi-dimensional modeling may be used in some cases. Additional attributes of the list component layout, such as the padding around the edges of the items, the gap between items, and the size and shape of the list background, can be determined from the art work representing the list items. For example, the padding and the gap attributes may be determined by averaging the padding and gap amongst art work pieces that represent items. As another example, the bounds of the list area background may be determined using a piece of background art work, such as a bounding box. In addition, generally, some or all of a list component layout may be specified or confirmed by a user.

The format and characteristics of the items within a list may also be manually or automatically created based on the artwork. For example, a music browsing application mockup that includes a piece of artwork showing a grid of music album covers with album names and prices can be analyzed and the subset of subitems can include the music album cover images, the album names, and the prices that appears in the artwork. The artwork may be visually laid out so that each piece of text is associated with an image. Given an identification of the subset of subitems of a piece of artwork that will comprise a list component, the user interface may determine a generic list item format that specifies that each item will comprise an image sub-component, an album sub-component, and a price sub-component. The generic list item format may also specify the relative locations of the sub-component, e.g., that the image sub-component will be displayed a certain distance above the album subcomponent for each item displayed, etc. The generic list item format can be determined by examining common features in list item representations in the artwork. The generic list item format can serve as a template for displaying each item in the list component such that data can be flowed into the template at run time. In certain embodiments, the user interface allows a user to manually specify a list item template (perhaps by changing default values that are automatically generated). For example, the user interface may prompt the user to identify a particular list item in the artwork to use and then request identification of each sub-component subitem within that model list item.

Certain embodiments extract "dummy data" from an artwork representation for use in developing a component. "Dummy data" is any data used in development for illustrative or other developmental purposes that is not used as part of the final application. In some cases, dummy data is used in places where runtime data will appear during execution of an application that is being developed. Generally, in development of an application from a piece of artwork, the artwork may include static specific images, text, and other exemplary features that are intended to be replaced by runtime data in the actual application. For example, a list component may be associated with a data source that will provide data at runtime.

During development, when the artwork is converted to a functional component of an application, the exemplary images, text, and other features need not necessarily be discarded. Instead such exemplary features may be stored and used as "dummy data" so that the developer can accurately envision the appearance of the application being developed.

While in certain embodiments, a user can manually make identifications that support the conversion of artwork into a list component, certain embodiments make some or all necessary determinations automatically, for example, using various heuristics or algorithms. For example, a user may identify several images that just happened to be laid out generally horizontally with respect to one another and indicate that the images should be used to make a list component. A development application may automatically recognize that there are a series of elements that have at least some common appearance attributes within (e.g., subcomponents) them and some common attributes relative to one another (e.g., the elements may be relatively consistently positioned horizontally and with respect to gap between adjacent items). Based on this information, the development application can make a preliminary determination that the intended list is a horizontal list with an estimated spacing between items and determine an estimated item template based on the common appearance attributes of the elements. The development application may further identify that the elements comprise static images and automatically extract these images out for use as dummy data.

Heuristics and algorithms can thus be used to automate one or more of a variety of different determinations including, but not limited to, determinations of (1) the structure of individual list items, e.g., item template; (2) the layout of the list items relative to one another, e.g., the list layout; and/or (3) how the individual pieces of an artwork list representation map into the list component items, so that the pieces can be extracted out and used as dummy data. These determinations may be interrelated. For example, a list layout may be determined and used to determine a structure of a generic list item. The determinations may also be made independent of one another. For example, determining item structure may be based on recognition of regularly repeating groups within a piece of artwork.

Certain embodiments use a combination of receiving manual input and making automatic determinations to facilitate the conversion of artwork into a list component. Similarly, the process of converting a list component can comprise various intermediate steps that need not all be completed at the same time. For example, a list component can be created from a group of items at a first stage and, later, the substructure of the items of the list can be determined. In the intermediate period after determining a list component layout but prior to determining the substructure of the items of the list component, the items of the list can simply be the existing graphics. Using one or more tools, the structure can then be determined or specified. This flexibility allows a user to work in an order that suits their style and needs. For example, a user might create the list component and begin prototyping the scrolling for the list component prior to deciding the actual structure of the list items using heuristics and/or using manual techniques to extract the structure.

A variety of techniques can be used to determine item structure. For example, heuristics may be employed to determine which pieces of art work are associated with a single item based on proximity of the pieces to one another. An algorithm can be used to examine and match individual pieces of artwork with one another. A heuristic or algorithm may recognize, as an example, that the art work includes sets of common elements, e.g., each set has an image and two pieces of text. An item template can be created that identifies common sub-items that all items of a list component may or may not have. The location coordinates of the pieces of art work can be used to make item structure determinations. Artwork may utilize or comprise nested vector graphics. Vector graphics can be recognized and extracted as a whole and treated like other data in certain embodiments.

Differences between artwork representations of list items can be recognized in certain embodiments. Such differences may be the bases for changing the generic item template and/or for changing a particular state of a list item. For example, a generic item template may be determined based on attributes that are in any of the artwork representations of list items. In such a case, the item template acts as a super set of all of the actual pieces of art work that you see in any of the items. As a specific example, if some items are starred, the generic item template may include a star item that can be displayed or not displayed by a particular list item component. Differences between artwork representations of list items may be the bases for changing a particular state of a list item. As a particular example, a star on an item may be desired for the selected state of the component. The user interface may facilitate a user selection of whether a given artwork attribute (e.g., star, highlighting, color, etc.) becomes an attribute of the generic item template, an attribute of a particular state, or is otherwise used or not used. Certain embodiments can automatically and/or manually map differences and inconsistencies between the different artwork items into properties of different states of an item template.

Similarly, an artwork mock up may illustrate items having different sizes, e.g., showing several similarly sized items along one line and one bigger item that has an extra text field associated with it. The standard and bigger sizes may be automatically and/or manually recognized as attributes for the unselected state and the selected state, respectively, of a list component that is created from the artwork. The extra text can also be automatically and/or manually associated with the selected state. In certain embodiments, the characteristics of the selected state can be inferred by comparing differences amongst the artwork representations of list items, e.g., by determining which attributes of an "odd" item are not like the attributes of the other items. In certain embodiments, automatic determinations may be made to provide suggestions that a user can then confirm or change.

Converting artwork to a list or other data component may be accomplished in several steps, some or all of which may be performed automatically. In cases where automatic conversion fails, a user can complete a given step. The steps can include identifying the items and/or identifying the layout of the items. Identifying the items, for example, can be done automatically using a clustering algorithm, based on a user grouping the items in the list, or otherwise. Identifying the layout of items may involve, for example, a user identifying what type of layout the items use and specifying its parameters. Alternatively, the layout type and/or parameters may be determined automatically, for example, such that the layout and/or parameters optimally describe the artwork representation of the list or data component. As one example, a layout may be determined by closely approximating it as a parameterized function in space (line, polynomial, bezier curve, grid, etc.) and using known statistical regression techniques to fit the function to the items. Parameters of such an optimal function may be used as the parameters of the layout.

Additional attributes can be defined, including but not limited to, attributes related to states (e.g., rollover, selected), the animation of states, and/or dynamically adding data, e.g., data from a web service or other data source. When using a list or other component as a data collection, methods may comprise extracting data from an artwork representation of the list and replacing the layout of each item with an item template. Extracting data from the list may involve mapping visual subitems of each item to the corresponding visual subitems of the other items. This can be done automatically through ad-hoc heuristics (e.g. items of the same type in corresponding locations map to each other), or the user can create the mapping by selecting corresponding items. Replacing the layout of each item with a canonical layout or item template can be done automatically, for example, by averaging the layouts of the existing items, or the user can choose an artwork representation of an item to use for the canonical layout. There may be multiple canonical layouts corresponding to multiple states of the item template.

Once an artwork representation of a list has been converted to a functional list component, a user can continue development of the application. For example, a user can interact with a fully dynamic list to can add items simply by adding rows to the data collection or can replace a whole collection with dynamic data from a web service or other data source.

Exemplary Workflow for Creating a List Component From Artwork

FIGS. 17-23 illustrate an exemplary workflow for creating a list component from artwork in the context of converting a specific exemplary artwork representation of a list. FIG. 17 illustrates a basic, exemplary high level workflow 1700 for creating a list component from artwork in certain embodiments. The workflow comprises determinations of what are the items 1710, what types of items are there 1720, how do the items relate 1730, and what is the list's layout 1740. In certain embodiments, a workflow will be presented to a user. For example, the workflow 1700 may be presented in a form of an interactive user interface or wizard which a user can use to select options and make identifications and determinations. Other workflows and/or interfaces may be used in other embodiments.

FIG. 18 illustrates the exemplary artwork representation 1800 of a list that will be converted to illustrate the workflow of FIG. 17. The artwork representation 1800 of the list comprises album cover images 1802, 1804, 1086, 1808, text for album titles 1812, 1814, 1816, 1820, and text 1818 for the artist of the fourth album 1808. The artwork further includes markings 1810 that are unique to the fourth album 1808 and that are intended by the artwork creator to distinguish the appearance of a selected album in the list of albums that the artwork 1800 is intended to represent.

Figure 19A:
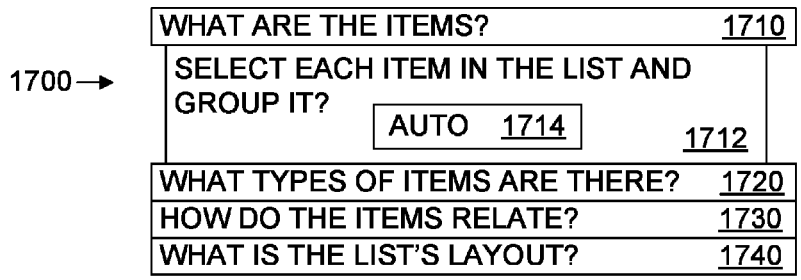
FIGS. 19a-c illustrate selecting items according to one embodiment.
Figure 19B:
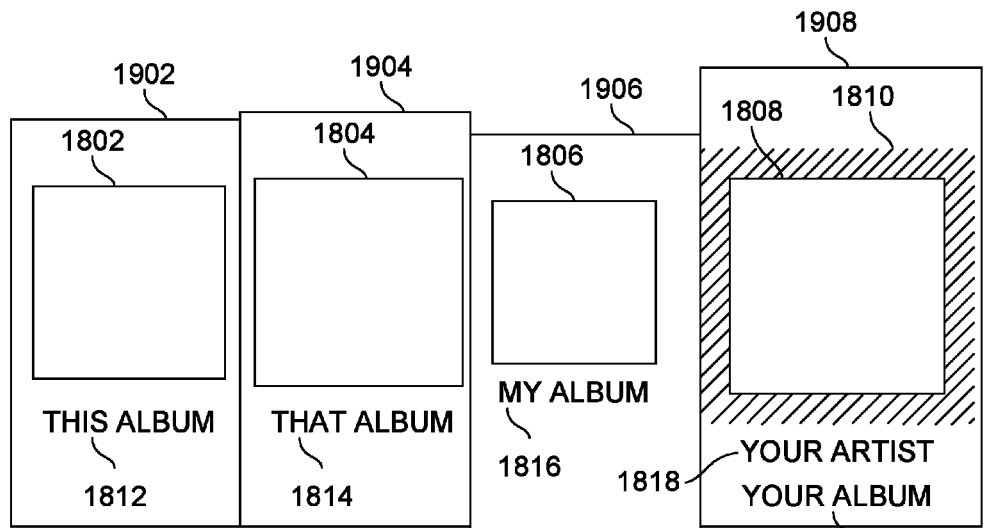
Figure 19C:
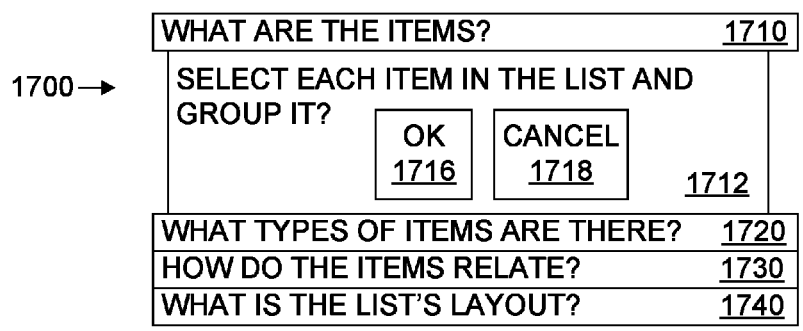

FIGS. 19*a-c* illustrate a selection of each item in the list and group it workflow step 1712. FIG. 19*a* illustrates an expanded view of the workflow 1700 of FIG. 17 and in the context of a user interface embodiment provides a user with an option 1714 to automatically group items, for example based on heuristic determinations. The user may also interact with a software or other tool in other ways to manually select or confirm the selection of each item in the list for the group. For example, as shown in FIG. 19*b*, the user may identify each item on the artwork within a software tool by drawing boxes 1902, 1904, 1906, 1908 around each item. In this case, the user has drawn a box 1902 around the first image 1802 and the first album title text 1812, indicating that these pieces of the artwork are grouped as a single item. The user can manually draw the remaining boxes or select a command that causes automatic selection of the remaining items. This automatic selection of the remaining items may, for example, utilize heuristics that account for the user's grouping selection for the first item. As shown in FIG. 19c, the workflow 1700 can ask the user to confirm the grouping selections by pressing an OK button 1716 or cancel the selection by pressing a cancel button 1718.

FIGS. 20a-c illustrate a workflow step 1722 relating to defining multiple states for an item. This workflow step 1722 asks "If your list contains an item in multiple states, select all the items in each state and click +" and provides a plus button 1724. For example, as shown in FIG. 20B, a user can select the first three items 2002, 2004, and 2006 and press the plus button 1724. This action identifies these items as items in a first state. These items 2002, 2004, and 2006 may be visually marked on the user interface, for example, with green highlighting or a green border. After the user has selected the items in the first state, the user selects the fourth item 2008 and presses the plus button 1724 to identify this item 2008 as an item in a different state. State indicators 1726, 1728 can appear within the user interface to confirm the user's action and provide visual references to the changes the user is making on the artwork interface of FIG. 20b. For example, a first state reference 1726 can appear on the workflow interface and comprise the same highlighting color (green) as the items in that state 2002, 2004, 2006. Similarly, a second state reference 1728 can comprise a blue highlighting color like the item 2008 with which it is associated. The interface may prompt the user to label or identify the states, e.g., "NORMAL," "DETAILS," etc.

Figure 21A:
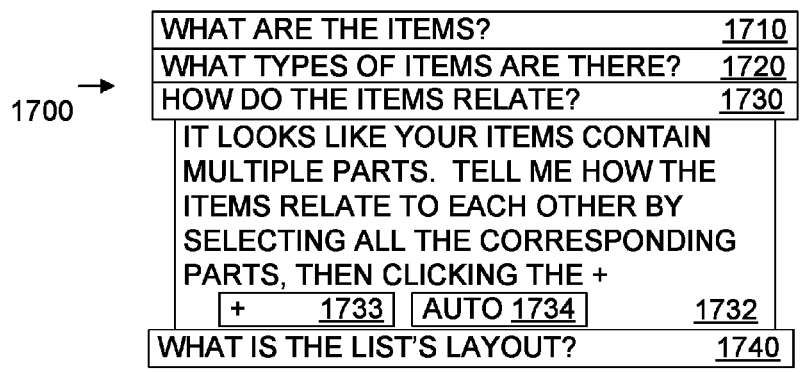
FIGS. 21a-c illustrate a workflow step relating to defining how items relate to one another, according to one embodiment.
Figure 21B:
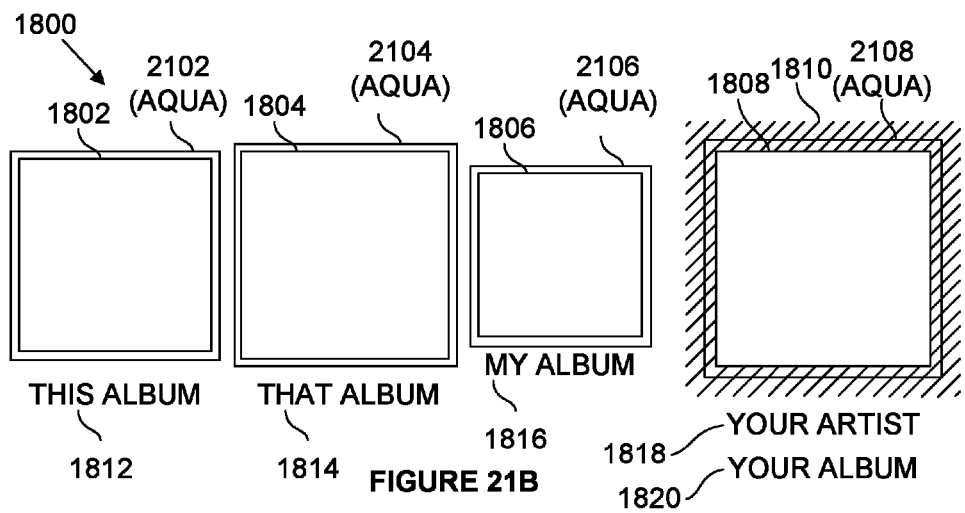
Figure 21C:
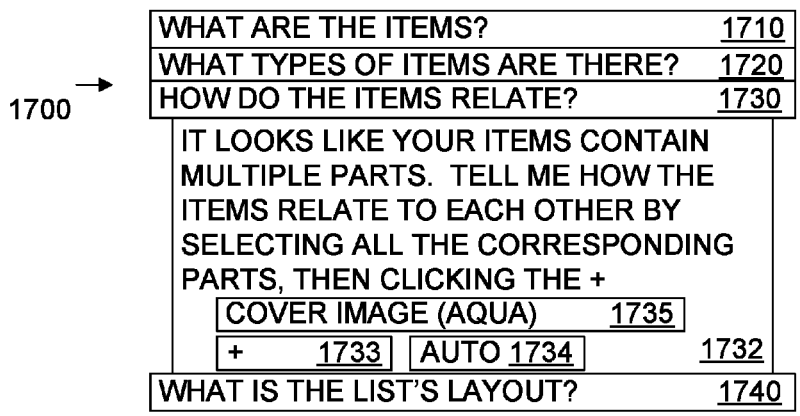

FIGS. 21a-c illustrate a workflow step 1722 relating to defining how items relate to one another. This workflow step 1722 asks "It looks like your items contain multiple parts. Tell me how the items relate to each other by selecting all corresponding parts, then clicking the +" and provides a plus button 1733. An auto button 1734 provides an option for automatic selection of which subitems relate to other subitems. Such automatic selection may be based, for example, on heuristics that compare the relative subitem locations and similarity of attributes of subitems within items. In the case of manual selection, as shown in FIG. 21b an aqua colored subitem indicator 2102, 2104, 2106, 2108 may be placed to identify each of these subitems as corresponding to the others. As shown in FIG. 21b, a workflow interface 1700 may present a subitem identification element 1735 that comprises the same color (aqua) as the aqua colored subitem indicator 2102, 2104, 2106, 2108. A user can then continue to identify additional subitem correlations or can elect to have additional subitem correlations automatically selected using the auto button 1734.

Figure 21D:
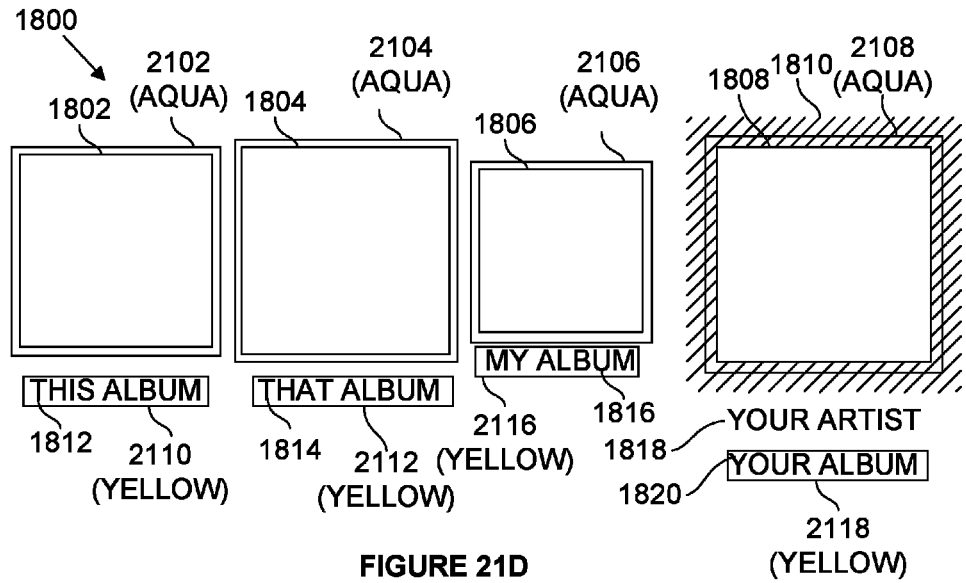
Figure 21E:
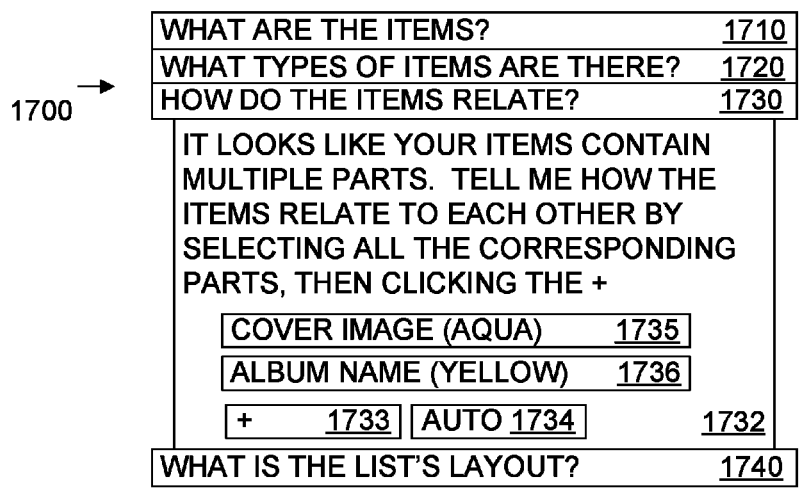

If the user elects to continue manually, the user can make selections for another item part. As shown in FIG. 21d, the user selects that album title item parts 1812, 1814, 1816, 1820 and places a yellow colored subitem indicator 2110, 2112, 2114, 2118 on or around each such part. As shown in FIG. 21e, a workflow interface 1700 may present a subitem identification element 1736 that comprises the same color (yellow) as the yellow colored subitem indicator 2112, 2114, 2116, 2118.

Figure 21F:
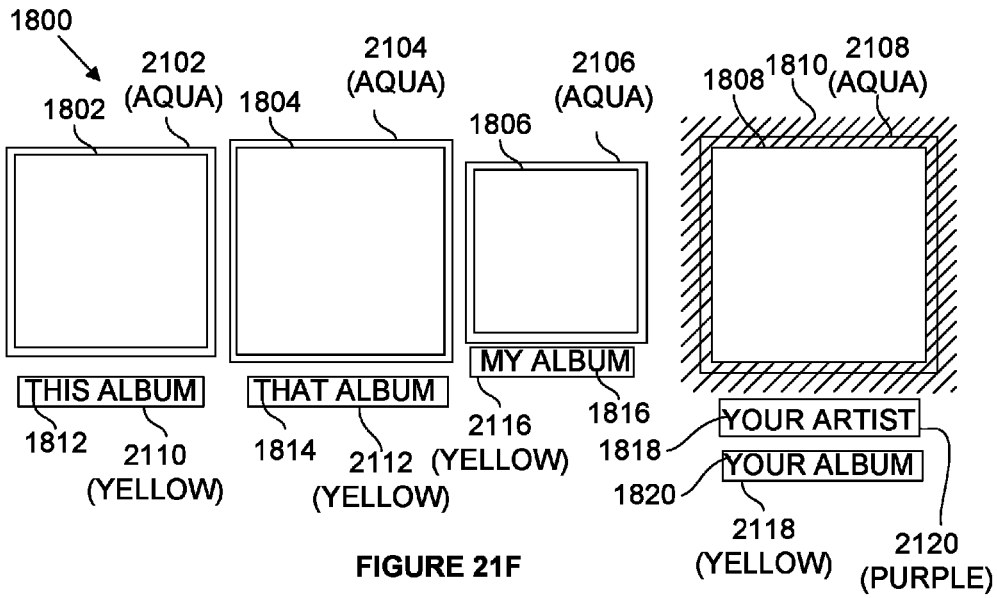
Figure 21G:
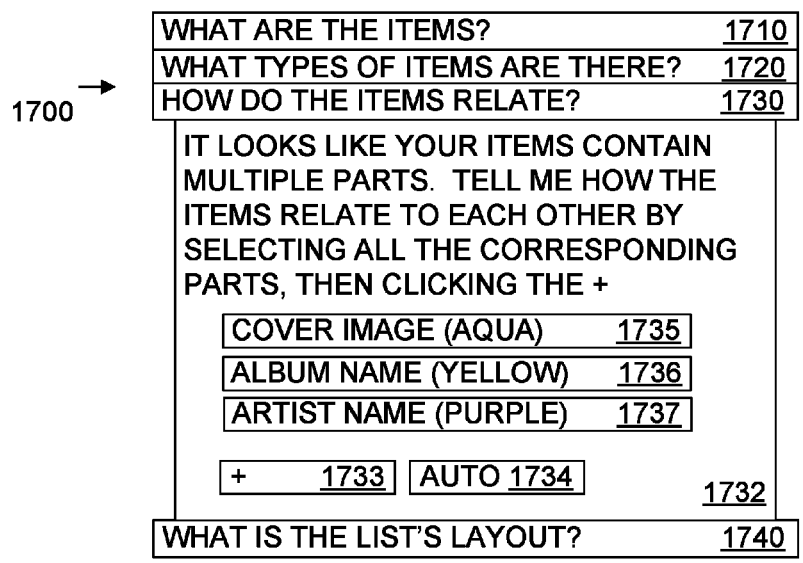

After selecting all common parts for a general item template, the user can select unique parts or part attributes that will ultimately be included in one or more particular states of the item or may be included in all states if determined appropriate. As shown in FIG. 21f, the user selects an album artist attribute 1818 that appears only in one of the items and marks it with a purple colored subitem indicator 2120. As shown in FIG. 21g, a workflow interface 1700 may present a subitem identification element 1737 that comprises the same color (purple) as the purple colored subitem indicator 2120.

Figure 22A:
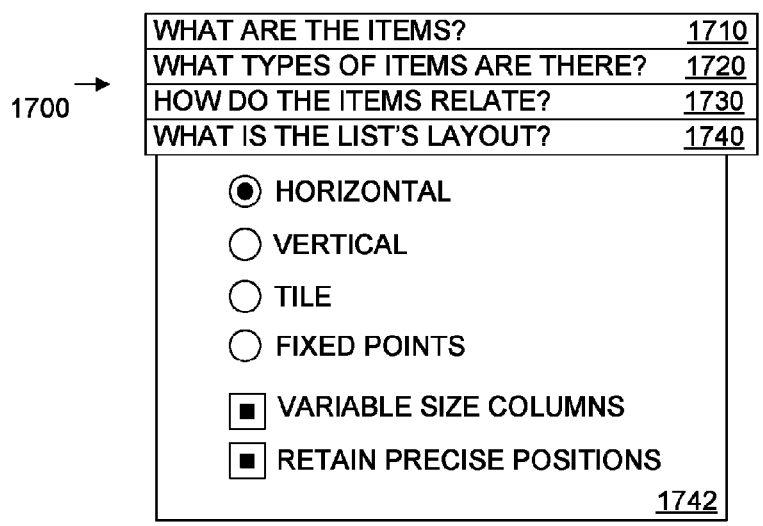
Figure 22B:
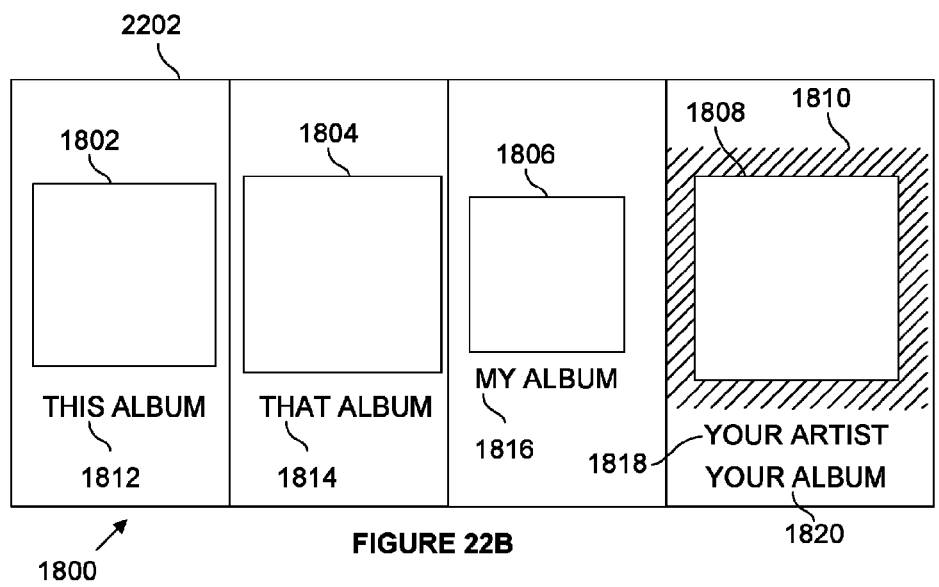
Figure 23A:
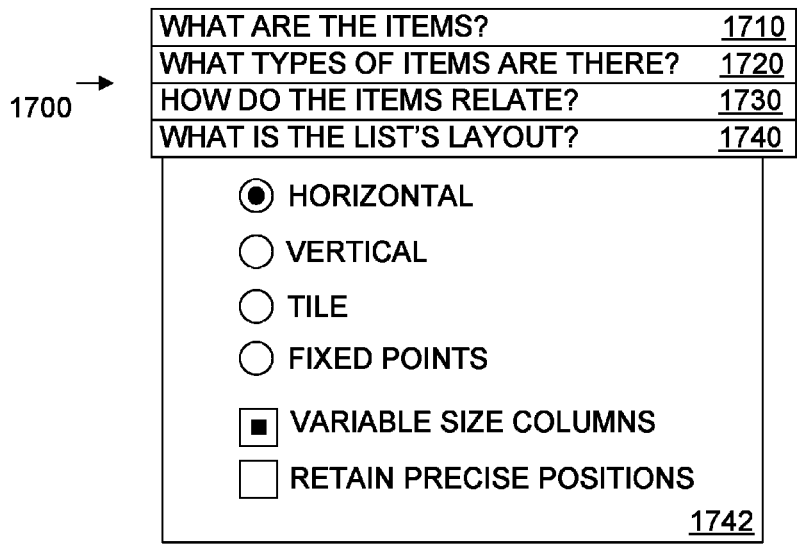
FIGS. 23a-b further illustrate the workflow step relating to selection of a list's layout shown in FIGS. 22a-c.
Figure 23B:
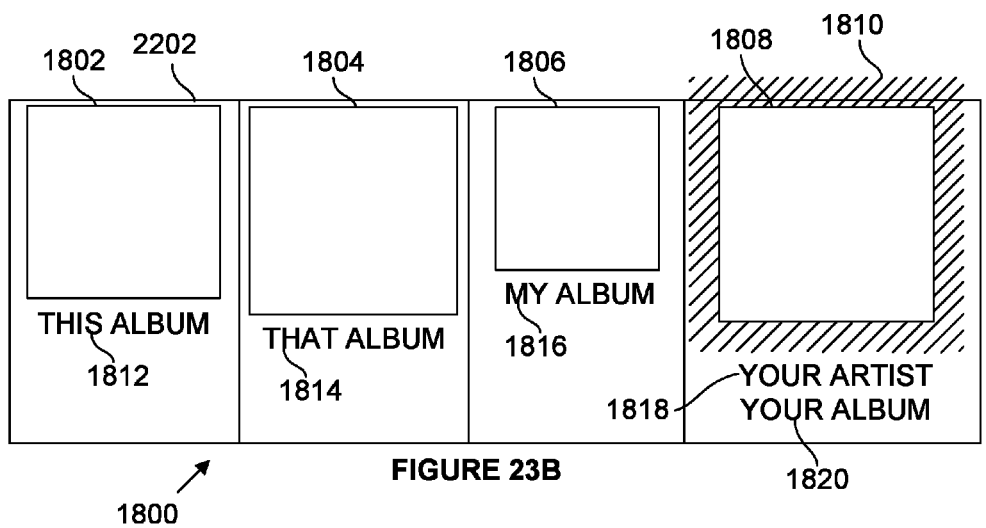

After defining how the items relate, the workflow interface 1700 may provide a selection area 1742 for a user to define a list's layout, for example, as shown in FIG. 22a. The workflow interface 1700 allows selection of one or more alternative layout types, e.g., horizontal, vertical, tile, fixed points, etc., and provides various other layout options, e.g., variable size columns, retain precise positions, etc. Changes to the selection area 1742 affecting the list's layout may have an immediate impact on the list being developed. For example, the list layout of FIG. 22b reflects a horizontal layout type 2202 with variable size columns and in which precise positions are retained as specified in the workflow interface of FIG. 22a. In contrast, the list layout of FIG. 23b reflects the horizontal layout type 2202 with variable size columns but in which precise positions are not retained, as specified in the workflow interface shown in FIG. 23a.

Additional Exemplary Workflow and Interface for Creating a List Component From Artwork FIGS. 24-31 illustrate an interface for a development tool or wizard for converting artwork to a list. The interface of the development tool 2400 displays artwork representing several items for a list. The representation of the first item comprises a first album image 2402 and text of the first album title 2412. The representation of the second item comprises a second album image 2404 and text of the first album title 2414. The representation of the third item comprises a third album image 2406 and text of the third album title 2416. The representation of the fourth item comprises a fourth album image 2408, text of the fourth album artist 2418, and text of the fourth album title 2420. The interface of the development tool 2400 further comprises a data collections area 2450.

Figure 24:
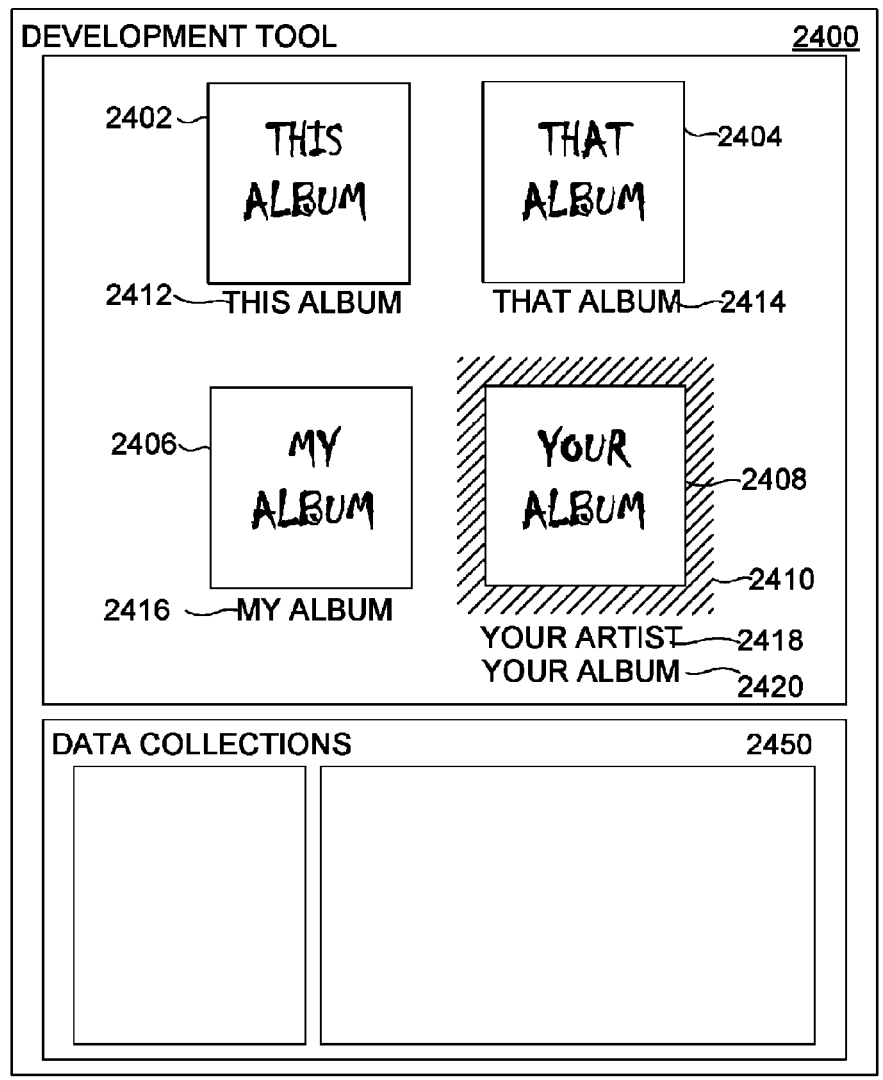
FIG. 24 illustrates an exemplary interface for a development tool for converting artwork to a list, according to one embodiment.
Figure 25:
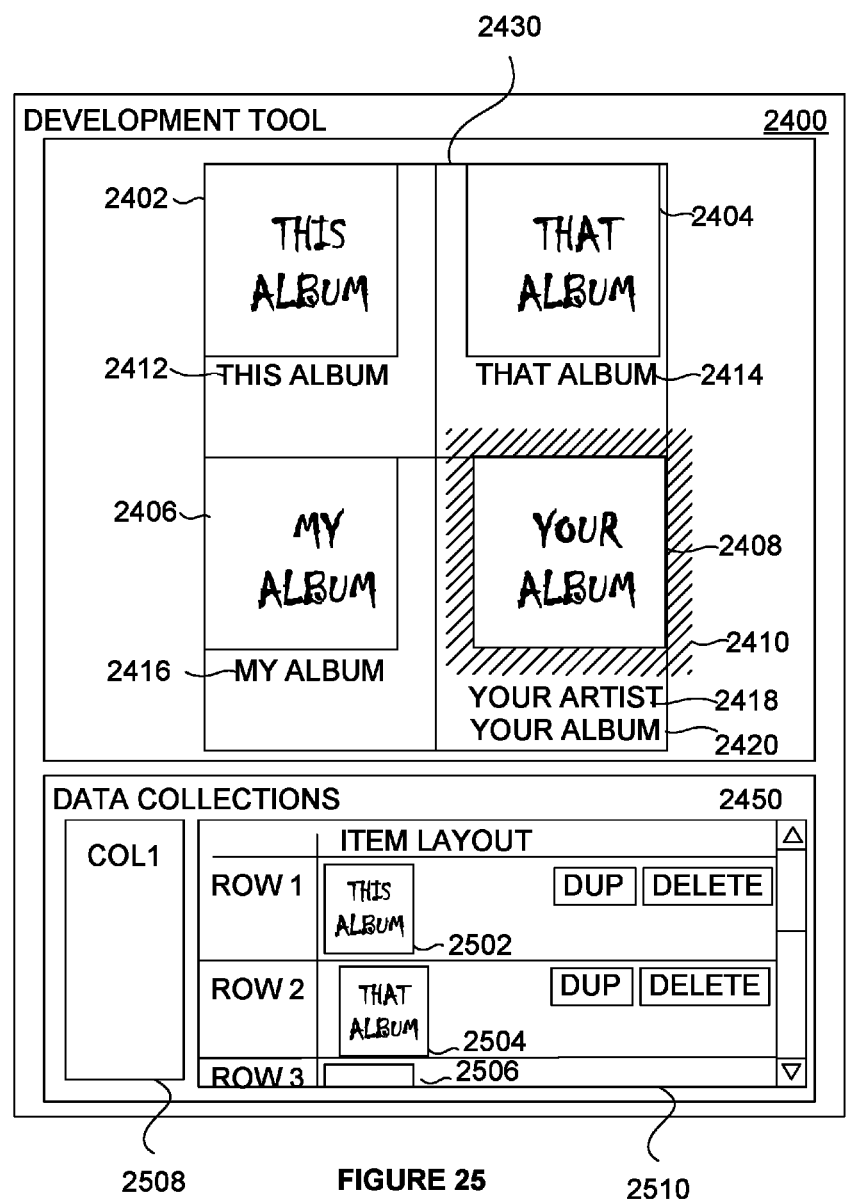
FIG. 25 further illustrates the exemplary interface of FIG. 24.

In FIG. 24, a user has tried to automatically convert artwork to a list, but the development tool 2400 has failed to extract the data correctly. The user undoes this action and starts a manual workflow process. The user selects artwork representing the list items. Each item is already grouped. Once the artwork is selected, the user chooses to "convert artwork to list." In response, as shown in FIG. 25, the development tool 2400 creates a list with four items (from the four pieces of artwork), and automatically determines a layout of the list. In estimating a list layout 2430 there may be some loss of fidelity since layouts are dynamic. The user may tune parameters of the layout to achieve the desired effect. The development tool 2400 also has created and displayed a data collection 2508 for the items of the list and an associated item layout tool 2510. At this point the items in the collection are simply the source graphics 2502, 2054, 2506, etc. A user can add or remove item rows for the data collection 2508, for example, using duplicate or delete commands. If the user has automatically had an item template created or otherwise does not need to create or modify an item template, he may simply stop at this point.

Figure 26:
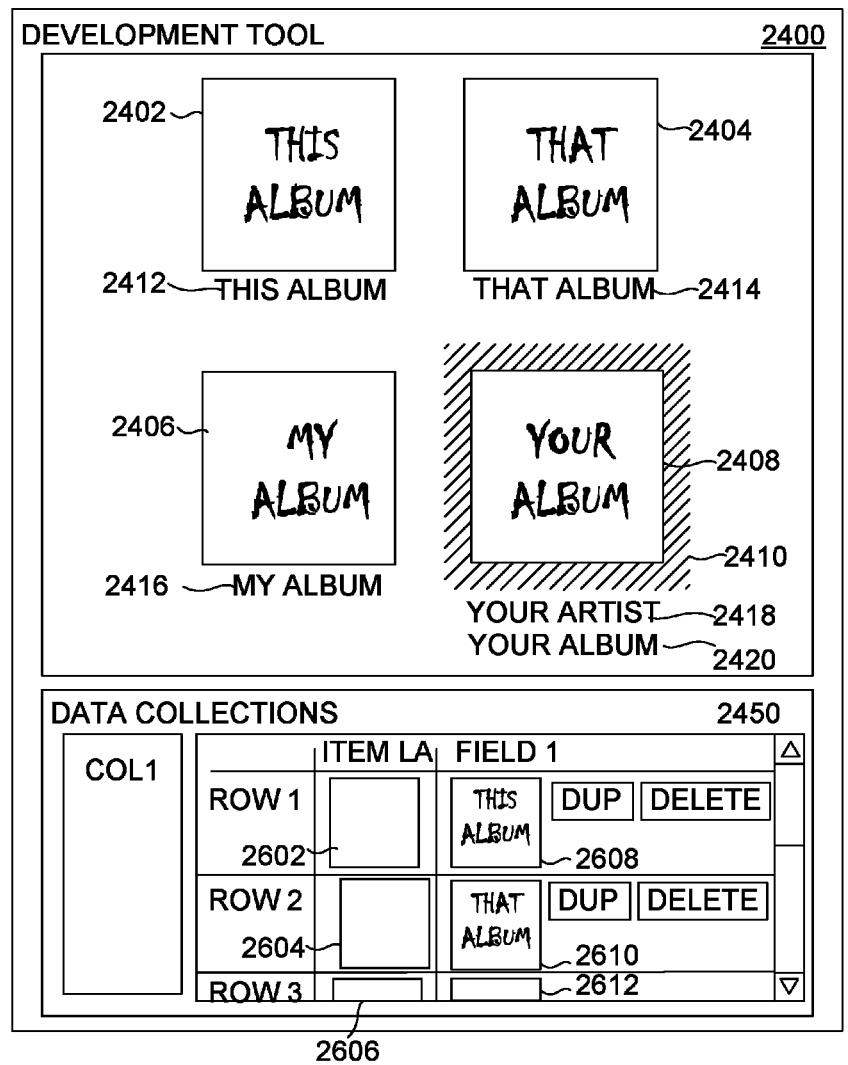
FIG. 26 further illustrates the exemplary interface of FIG. 24.

FIG. 26 illustrates how a user can easily separate data fields and replace "dummy" data with real data. The user selects corresponding parts of each item and chooses an extract field command. In response, as illustrated in FIG. 26, the development tool 2400 created a field comprising only the "data" contained in the selected item, which depends on the type of the selected item. As examples, the data of a label or text block can be the text itself, the data of a bitmap can be the pixel information, the data of a vector graphic container can be the actual vector graphics information. In this case, Field 1 comprises the image data 2608, 2610, 2612, etc. Each item layout 2602, 2604, etc., can provide a template with place-holders for the data that was extracted.

Figure 27:
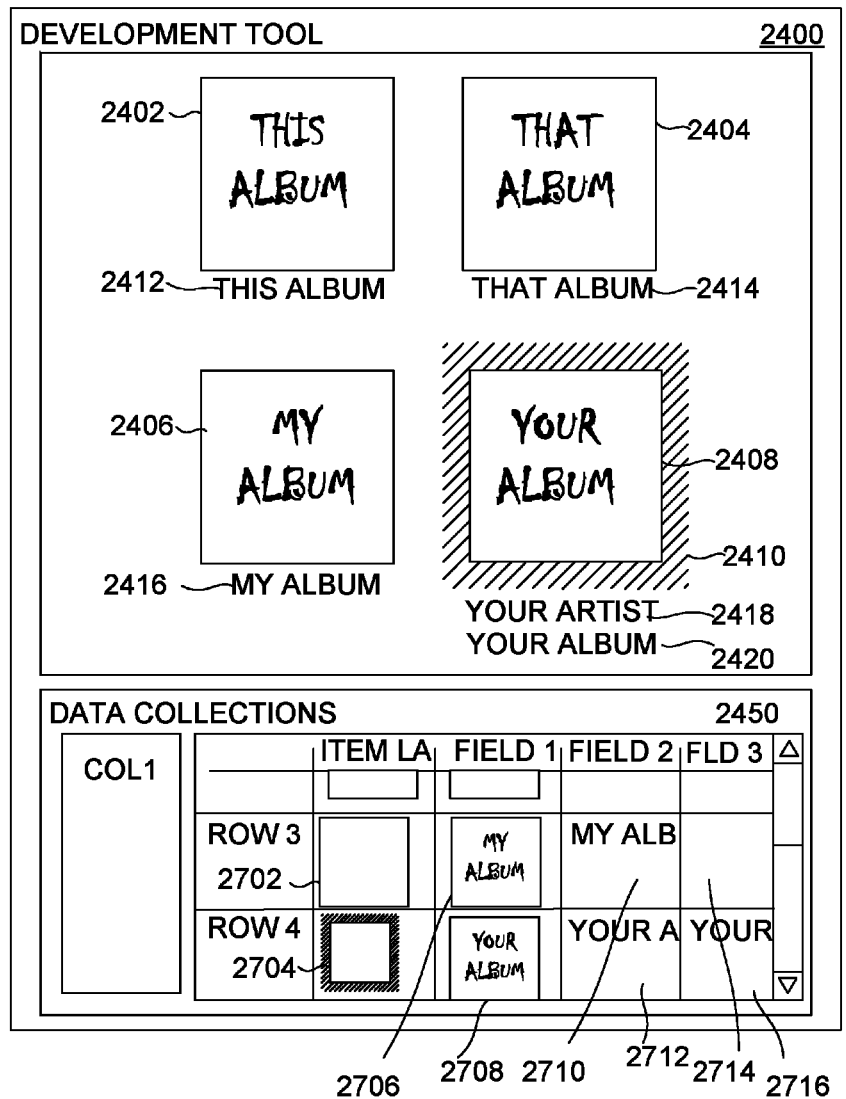
FIG. 27 further illustrates the exemplary interface of FIG. 24.

The data extraction process can be repeated until all data has been extracted. As shown in FIG. 27, each of the additional fields is populated with data from the artwork. In this case, field 2 comprises text 2710, 2712, etc. from the artwork's album titles 2412, 2414, 2416, 2420, and field 3 comprises text 2714, 2716, etc. from the artworks album artists 2420. Some fields may only be present for some items. In this case, Field 3 has a value for the row 4 item 2714, but not for other row items. FIG. 27 also illustrates that the item layout of the row 4 item 2704 is different from the item layout of the other row items (e.g., the row 3 item layout 2702). In this case, a designer intended that the row 4 item layout 2704 represent the selected state of a list item.

Figure 28:
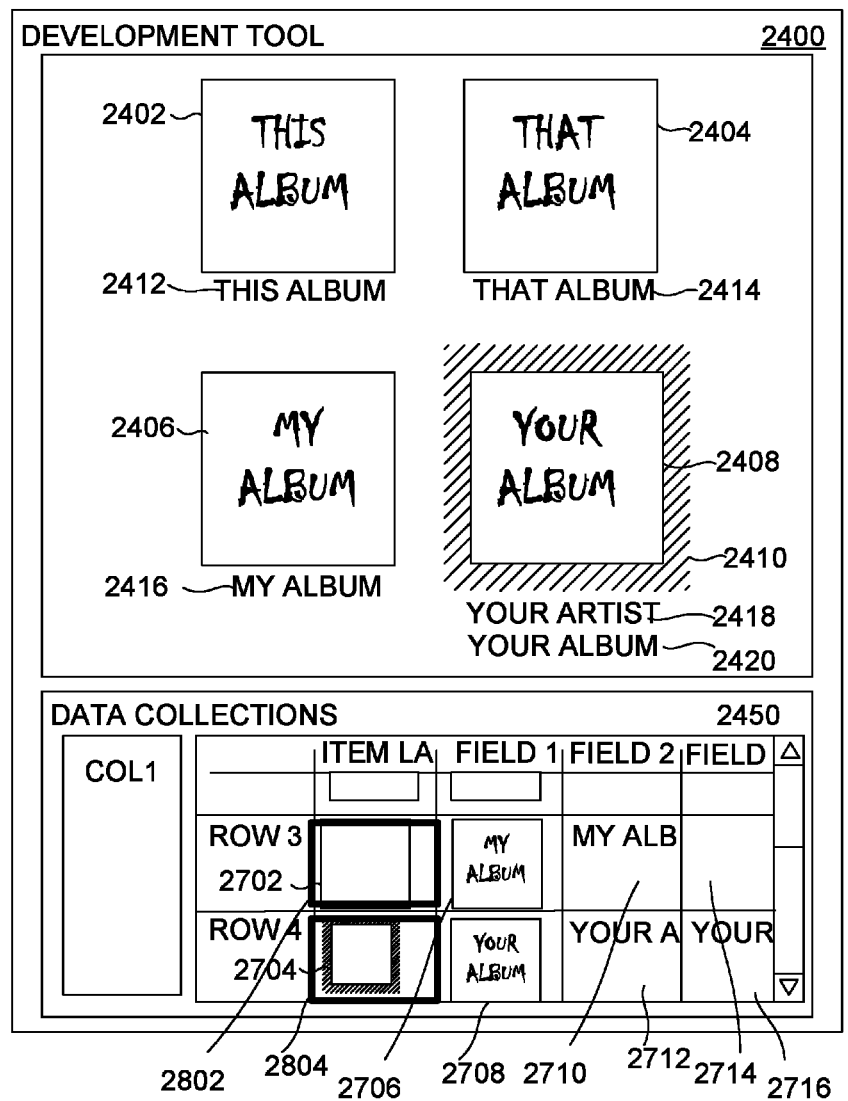
FIG. 28 further illustrates the exemplary interface of FIG. 24.
Figure 29:
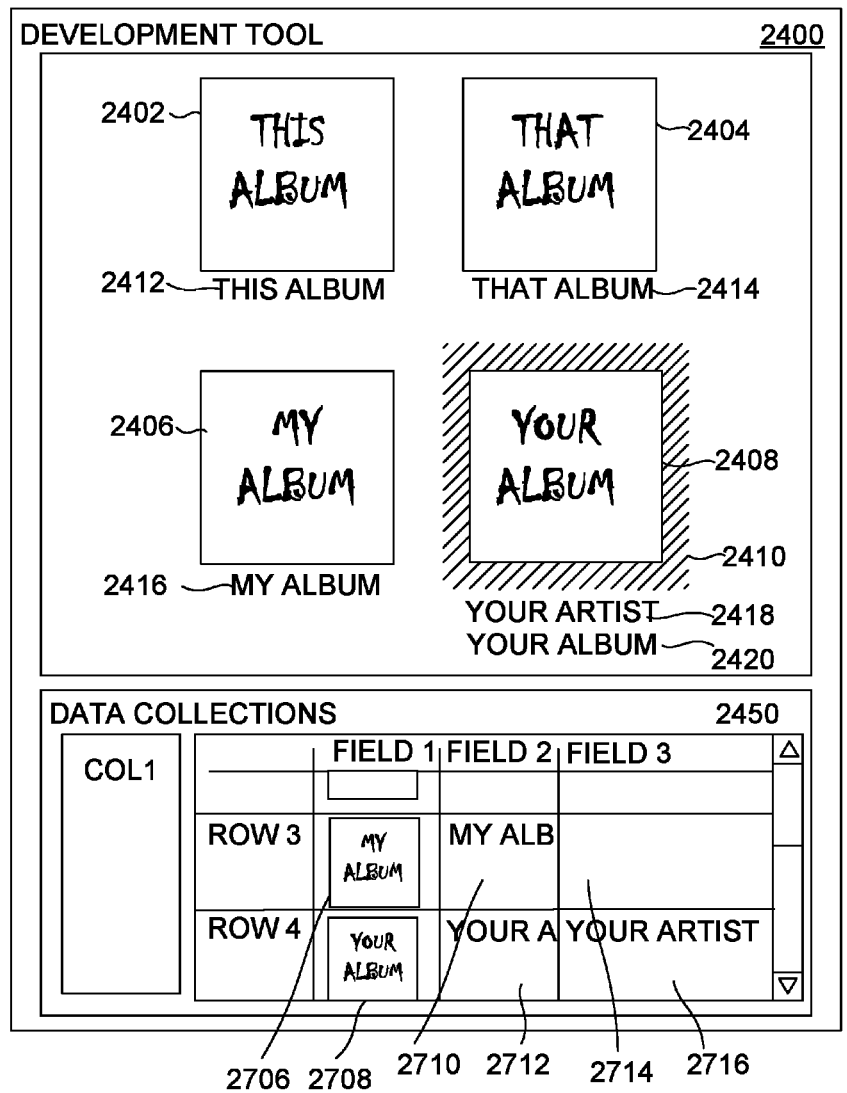
FIG. 29 further illustrates the exemplary interface of FIG. 24.

As shown in FIG. 28, the interface of the development tool 2400 allows a user to use a single item template so that the layout of all items can be edited simultaneously. The user can also define the appearance of a selected item. The user selects each template 2802, 2804 that represents a different state of the template and chooses a use as item template command. In response, as shown in FIG. 29, the development tool 2400 removes the "item layout" column from the data collection 2450 and defines each item as using the standard template. The two templates that were selected (2802, 2804 in FIG. 28), serve as the two states of the item template (normal, selected). The development tool 2400 guesses which is which and the user can change these defaults at a later point.

Figure 30:
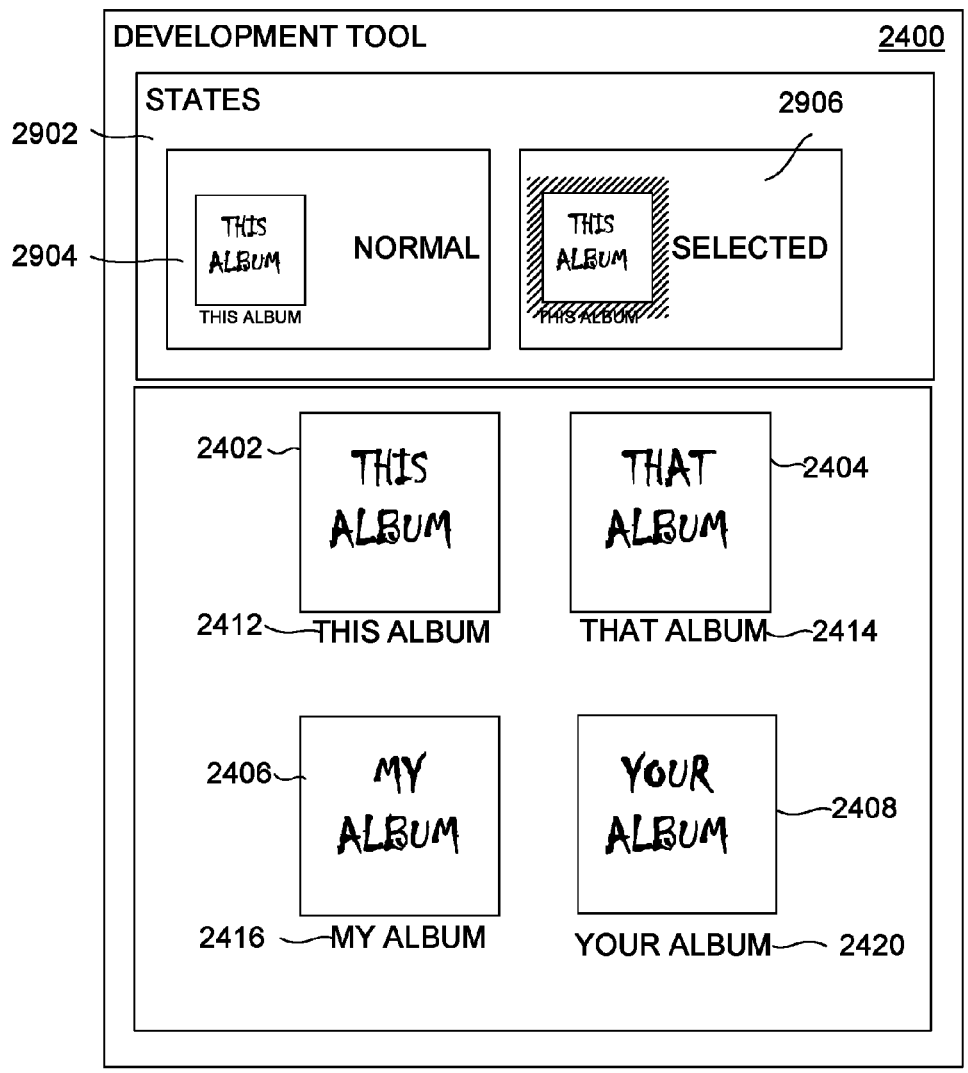
FIG. 30 further illustrates the exemplary interface of FIG. 24.
Figure 31:
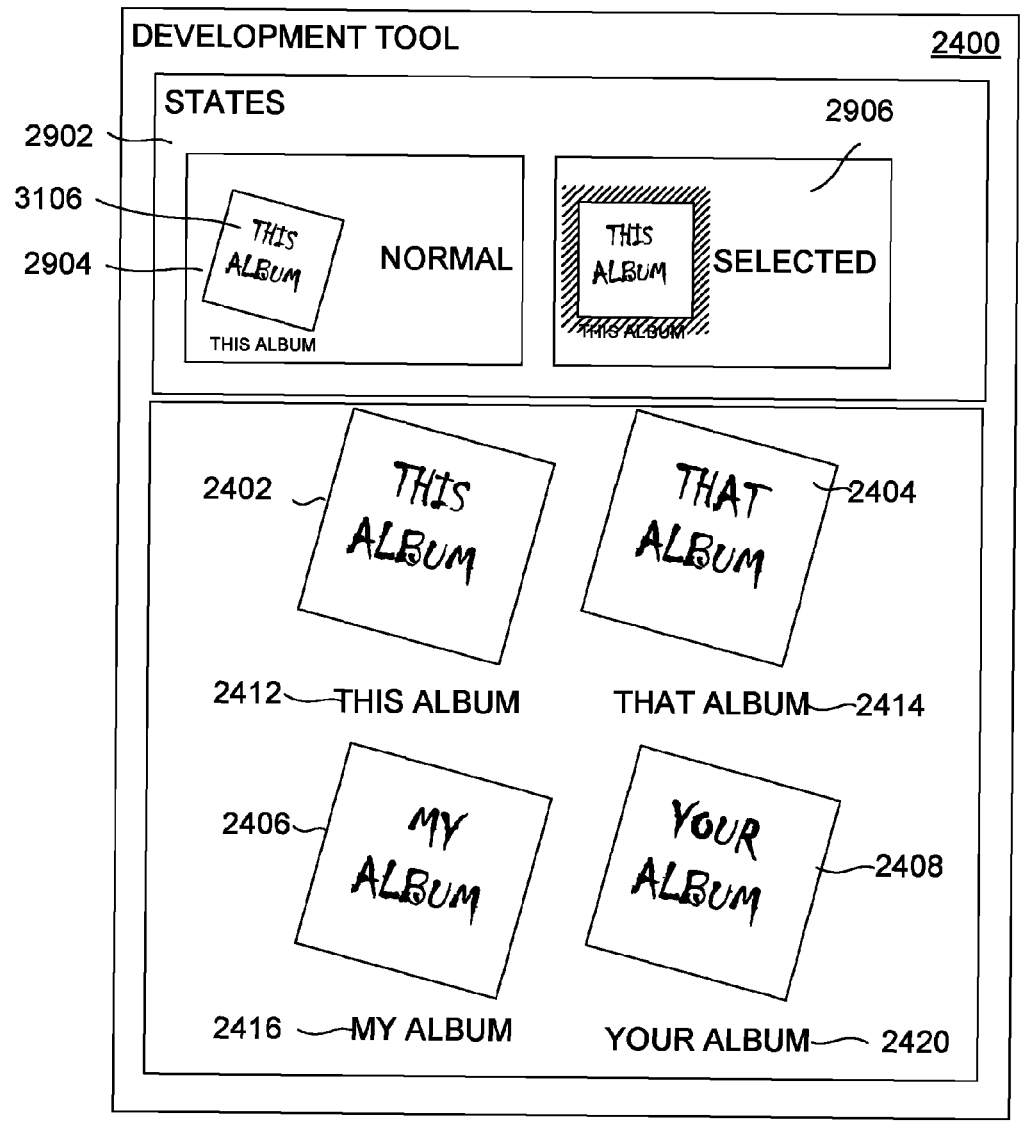
FIG. 31 further illustrates the exemplary interface of FIG. 24.

FIG. 30 illustrates the development 2400 providing a states interface 2902 that allows a user to edit the item template. This states interface 2902 may be presented, for example, when the user double-clicks on one of the list items. The states interface 2902 in this comprises a normal state edit portion 2904 and a selected states edit portion 2906. Additional states can be created and displayed as well. If the user makes a change to a state, the change, can be reflected in the development tool 2400. For example, if the user changes the normal item template 2904 by rotating the album image portion 3106, the displayed album images 2402, 2404, 2406, 2408 of the items can change to reflect the change as shown in FIG. 31.

Exemplary Method of Estimating a Dynamic List Layout

One exemplary method of estimating a dynamic list layout involves using a set of candidate layout functions, e.g., a two dimensional line, a two dimensional polynomial, a two dimensional ellipse, a two dimensional grid, a three dimensional line, a three dimensional ellipse, etc. The method may involve testing each function one after the other until a satisfactory function is identified. Standard statistical regression and other techniques may be used to test whether a particular function is a satisfactory fit. In testing a given function, an error can be computed (e.g., the mean squared distance from each item to the optimal curve) and compared with a threshold. If the error is less than the threshold the function is satisfactory. If the error is greater than the threshold, the next candidate function can be tested.

Figure 32A:
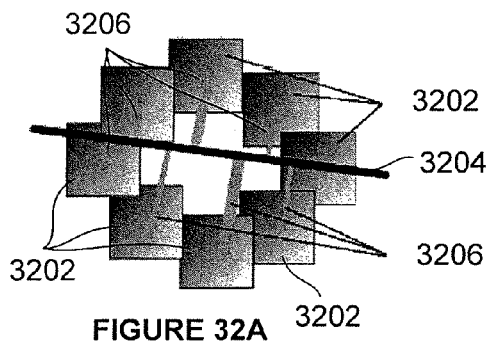
FIGS. 32a-g illustrate an exemplary method of estimating a dynamic list layout according to one embodiment.
Figure 32B:
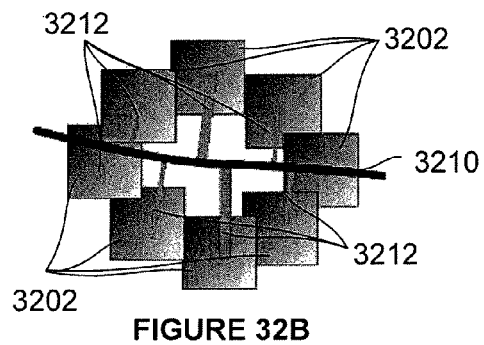
Figure 32C:
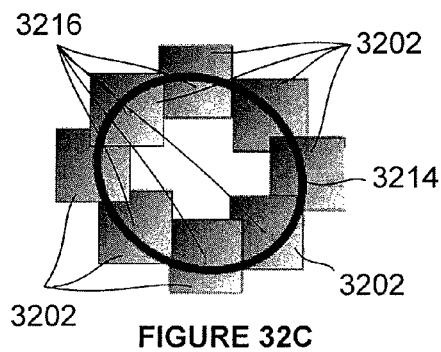
Figure 32D:
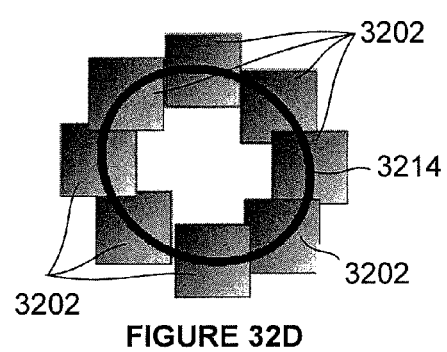
Figure 32E:
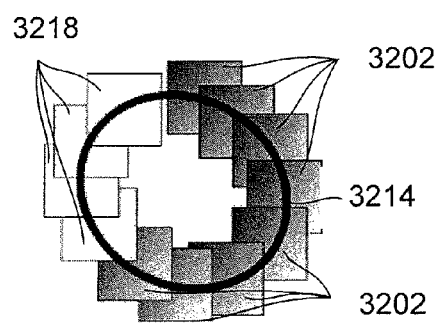
Figure 32F:
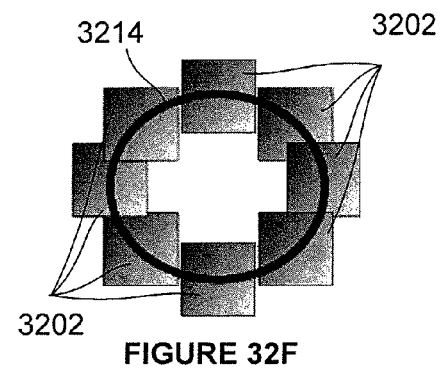
Figure 32G:
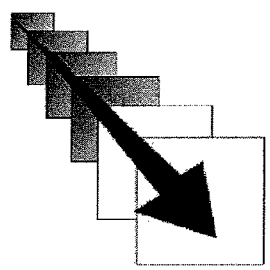

FIGS. 32a-f illustrates an exemplary method of estimating a dynamic list layout according to one embodiment. FIG. 32a illustrates an attempt to fit a line 3204 to a set of list items 3202. The combined error 3206, however, is too great. FIG. 32b illustrates an attempt to fit a low-order polynomial function 3210 to the set of list items 3203. The combined error 3212 is again too great. FIG. 32c illustrates an attempt to fit an ellipse 3214 to the set of list items 3202. In this case, the combined error 3216 is acceptable. After selecting the ellipse as the layout for the items, the items positions are discarded and the elliptical layout is used to manage the positions of the individual list items, as shown in FIG. 32d. When new items 3218 are added dynamically, the layout 3214 can be used to reposition the existing items 3202 and to position the new items 3218 appropriately as shown in FIG. 32e. The user can also control the layout by altering the layout parameters rather than by directly manipulating the items. As shown in FIG. 32f, the rotation of the layout can be changed to 0, rotating the entire set of items 3202. As illustrated in FIG. 32g, three dimensional layouts can also be estimated, for example, using standard cues for three dimensional placement. In one embodiment, items may not actually be laid out in 3 dimensions but rather may use three dimensional cues (e.g., relative size and brightness) to guess where the items are placed in three dimensions. Once three dimensional item locations are estimated, regression can be performed.

These techniques and the other techniques discussed with respect to an exemplary list component are not specific to lists and may be used for any set of items in a dynamic layout, among other things.

Exemplary Method of Converting Artwork that Includes a List Representation

Figure 33:
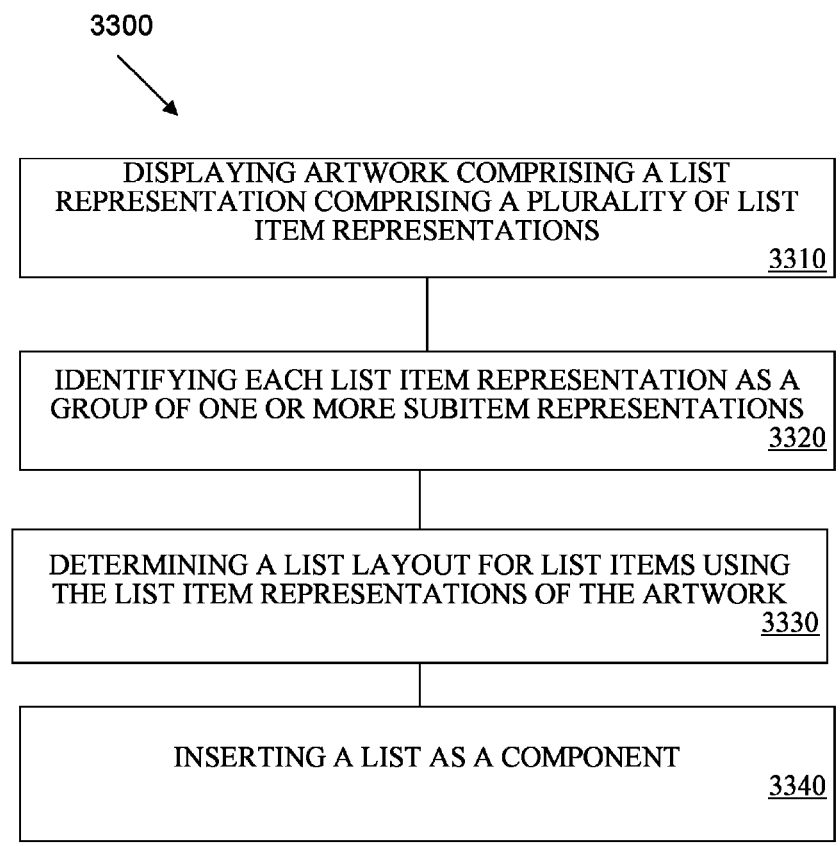
FIG. 33 is a flow chart illustrating one method 3300 of converting artwork with a list representation to a list component, according to one embodiment.

FIG. 33 is a flow chart illustrating one method 3300 of converting artwork with a list representation to a list component, according to one embodiment. The method 3300 may comprise displaying artwork comprising a list representation comprising a plurality of list item representations, as shown in block 3310.

The method 3300 may comprise identifying each list item representation as a group of one or more subitem representations, as shown in block 3320. For example, it may comprise automatically identifying each list item representation automatically based on heuristics and/or based at least in subitem on receiving a selection (or multiple selections) identifying the list item representations comprising a first group (or multiple groups).

The method 3300 may comprise determining a list layout for list items using the list item representations of the artwork, as shown in block 3330. This may involve receiving a selection of a layout type and/or approximating a list layout using a function. For example, each list item representation may be approximated as a point location and a regression analysis may be performed to identify a function. Approximating the list layout using a function may comprise determining an appropriate function by testing one or more potential functions against a threshold level of accuracy. Determining a list layout using the list item representations of the artwork may comprise determining a padding around list item edges using the list item representations of the artwork, determining a gap between list items using the list item representations of the artwork, and/or determining a list background using the list item representations of the artwork.

The method 3300 may comprise inserting a list as a component, as shown in block 3340. The list may be used to determine the positions of either the list item representations or list items replacing the list item representations. For example, such positions may be determined based on the list layout.

The method 3300 may further comprise determining a list item template that defines a structure for each of the list items. Determining the list item template may comprise receiving selection of multiple subitem representations to be associated with a same list item template subitem and/or comparing relative locations of one or more subitem representations.

The method 3300 may further comprise extracting dummy data from the artwork. Such dummy data may be used for a variety of benefits. For example, dummy data may be made available during development and then replaced by runtime data during execution of the application that is being developed. Among other things the use of dummy data in a development environment can facilitate the modeling of the appearance of an application that is being developed.

General

The foregoing description of the embodiments has been presented only for the purpose of illustration and description and is not intended to be exhaustive or to limit the invention to the precise forms disclosed. Numerous modifications and adaptations are apparent to those skilled in the art without departing from the spirit and scope of the invention. For example, the idea of extracting information from static artwork and using that information to construct a working application can be applied to data other than artwork fragments. Other information might include: specific visual properties such as color or effects (e.g. shadow, bevel); text properties such as font and size; sample data—the static artwork might contain a text string (such as "Lorem ipsum") or an image, which is not intended to appear in the finished application but which can be saved with the component for use as "dummy data" at author-time, when no real data is available; layout information, such as the relative placement of different parts; and so on.

That which is claimed:

1. A method of developing an application, the method comprising:
    displaying artwork in an application development environment, the artwork comprising a list representation comprising a plurality of list item representations;
    identifying, by a processor, each list item representation as a group of one or more subitem representations, the identifying performed at least in part automatically based on heuristics or an algorithm;
    determining, by the processor, a list layout for list items using the list item representations of the artwork; and
    creating, by the processor, a list for determining the positions of either the list item representations or list items replacing the list item representations, the positions determined based on the list layout.

2. The method of claim 1, further comprising determining a list item template, wherein the list item template defines a structure for each of the list items.

3. The method of claim 1, wherein identifying each list item representation as a group of one or more subitem representations is performed automatically based on heuristics.

4. The method of claim 1, wherein identifying each list item representation as a group of one or more subitem representations is based at least in part on receiving a selection identifying the list item representations comprising a first group.

5. The method of claim 1, wherein identifying each list item representation as a group of one or more subitem representations is based at least in part on receiving selections identifying the list item representations comprising the group for each list item representation.

6. The method of claim 1, wherein the list layout is selected from one of horizontal, vertical, grid, or diagonal.

7. The method of claim 1, wherein determining a list layout using the list item representations of the artwork comprises receiving a selection of a layout type.

8. The method of claim 1, wherein determining a list layout using the list item representations of the artwork comprises approximating the list layout using a function.

9. The method of claim 8, wherein each list item representation is approximated as a point location and a regression analysis is performed to identify a function.

10. The method of claim 9, wherein approximating the list layout using a function comprises determining an appropriate function by testing one or more potential functions against a threshold level of accuracy.

11. The method of claim 1, wherein determining a list layout using the list item representations of the artwork comprises determining a padding around list item edges using the list item representations of the artwork.

12. The method of claim 1, wherein determining a list layout using the list item representations of the artwork comprises determining a gap between list items using the list item representations of the artwork.

13. The method of claim 1, wherein determining a list layout using the list item representations of the artwork comprises determining a list background using the list item representations of the artwork.

14. The method claim 1, further comprising determining a list item state, wherein the list item state defines a structure for list items when in a first state.

15. The method of claim 1, wherein the artwork is imported into or created in the application development environment.

16. The method of claim 1, wherein the artwork comprises both visible and invisible objects.

17. A method of developing an application, the method comprising:
    displaying artwork in an application development environment, the artwork comprising a list representation comprising a plurality of list item representations;
    identifying, by a processor, each list item representation as a group of one or more subitem representations, the identifying performed at least in part automatically based on heuristics or an algorithm;
    determining, by a processor, a list layout for list items using the list item representations of the artwork;
    determining, by the processor, a list item template, wherein the list item template defines a structure for each of the list items;
    creating, by the processor, a list for determining the positions of list items replacing the list item representations, the positions determined based on the list layout, the list items replacing the list item representations displayed according to the list item template.

18. The method of claim 17, wherein the list item template identifies parts of the list items, at least one subitem associated with one or more of the subitem representations.

19. The method of claim 17, wherein determining the list item template comprises receiving a selection of a subitem representation.

20. The method of claim 17, wherein determining the list item template comprises receiving selection of multiple subitem representations to be associated with a same list item template part.

21. The method of claim 17, wherein determining the list item template comprises comparing relative locations of one or more subitem representations.

22. The method of claim 17, further comprising extracting dummy data from the artwork, the dummy data made available during development but replaced by runtime data during execution of the application.

23. The method of claim 22, wherein the list in the design view area comprises the dummy data facilitate modeling of an appearance of an application being developed.

24. A system for developing an application, the system comprising:

a processor;

a non-transitory computer readable medium comprising instructions that, when executed by the processor, perform steps comprising:

providing a design view area for displaying artwork, the artwork comprising a list representation comprising a plurality of list item representations;

identifying each list item representation as a group of one or more subitem representations, the identifying performed at least in part automatically based on heuristics or an algorithm;

determining a list layout for list items using the list item representations; and inserting a list in the design view area, the list determining the positions of either the list item representations or list items replacing the list item representations, the positions determined based on the list layout.

25. A computer-implemented method comprising:

displaying artwork in an application development environment, the artwork comprising a list representation comprising a plurality of list item representations, identifying, by a processor, each list item representation as a group of one or more subitem representations, the identifying performed at least in part automatically based on heuristics or an algorithm; and identifying, by the processor, a function for approximating a list layout, wherein the function can be used to provide positions for list items and wherein the function is identified by measuring the accuracy of one or more candidate functions with respect to positions of one or more of the plurality of list item representations.

26. The method of claim 25, wherein identifying the function further comprises using a regression analysis.

27. The method of claim 25, wherein measuring the accuracy of one or more candidate functions with respect to positions of one or more of the plurality of list item representations comprises comparing the accuracy of the one or more candidate functions against a threshold level of accuracy.

28. A non-transitory computer-readable medium on which is encoded program code for developing an application in an application development environment, the program code comprising:

program code for displaying artwork in an application development environment, the artwork comprising a list representation comprising a plurality of list item representations;

program code for identifying each list item representation as a group of one or more subitem representations, the identifying performed at least in part automatically based on heuristics or an algorithm;

program code for determining a list layout for list items using the list item representations of the artwork; and program code for creating a list for determining the positions of either the list item representations or list items replacing the list item representations, the positions determined based on the list layout.

* * * * *